United States Patent
Kondo et al.

(10) Patent No.: US 10,513,586 B2
(45) Date of Patent: Dec. 24, 2019

(54) COATING AGENT, COATING FILM, LAMINATE AND SURFACE-PROTECTED ARTICLE

(71) Applicant: JNC CORPORATION, Tokyo (JP)

(72) Inventors: Kyoko Kondo, Chiba (JP); Kenya Ito, Chiba (JP); Hiroyuki Iizuka, Chiba (JP); Aki Kuromatsu, Chiba (TW)

(73) Assignee: JNC CORPORATION, Tokyo (JP)

( * ) Notice: Subject to any disclaimer, the term of this patent is extended or adjusted under 35 U.S.C. 154(b) by 41 days.

(21) Appl. No.: 15/563,561

(22) PCT Filed: Mar. 29, 2016

(86) PCT No.: PCT/JP2016/060270
§ 371 (c)(1),
(2) Date: Sep. 30, 2017

(87) PCT Pub. No.: WO2016/159023
PCT Pub. Date: Oct. 6, 2016

(65) Prior Publication Data
US 2018/0086882 A1    Mar. 29, 2018

(30) Foreign Application Priority Data

Mar. 31, 2015  (JP) .................................. 2015-074274

(51) Int. Cl.
*C08G 81/02*   (2006.01)
*C08L 75/16*   (2006.01)
(Continued)

(52) U.S. Cl.
CPC ............ *C08G 81/024* (2013.01); *B32B 27/30* (2013.01); *B32B 27/40* (2013.01); *C08F 2/50* (2013.01);
(Continued)

(58) Field of Classification Search
CPC .. C08G 18/44; C08G 18/672; C08G 18/5015; C08G 18/758; C08G 18/8116;
(Continued)

(56) References Cited

U.S. PATENT DOCUMENTS 4,666,783 A * 5/1987 Heil ..................... C08G 18/672
                                                252/62.54
2007/0014018 A1 * 1/2007 Wheatley ............... G02B 1/105
                                                359/580
(Continued)

FOREIGN PATENT DOCUMENTS

| CN | 102686642 | 9/2012 |
| CN | 103153617 | 6/2013 |

(Continued)

OTHER PUBLICATIONS

"International Search Report (Form PCT/ISA/210) of PCT/JP2016/060270", dated May 17, 2016, with English translation thereof, pp. 1-4.
(Continued)

*Primary Examiner* — Thao T Tran
(74) *Attorney, Agent, or Firm* — JCIPRNET

(57) ABSTRACT

Provided is a coating agent that can be formed into a surface layer having excellent self-restoring properties and stain-proof properties by applying the coating agent onto a surface of a base material (for example, thermoplastic polyurethane) and curing the resulting material. The coating agent according to the present application contains urethane (meth)acrylate-based resin (a), fluorine-based compound (b) and photopolymerization initiator (d). Urethane (meth)acrylate-based resin (a) has weight average molecular weight (Mw) of 10,000 to 800,000. Fluorine-based compound (b) has at least two polymerizable functional groups. The surface layer formed of the coating agent has excellent self-restoring (Continued)

properties of a scratch, stain-proof properties and stretchability.

6 Claims, 1 Drawing Sheet

(51) Int. Cl.

| | | |
|---|---|---|
| C08L 33/08 | (2006.01) | |
| C08L 33/10 | (2006.01) | |
| B32B 27/30 | (2006.01) | |
| B32B 27/40 | (2006.01) | |
| C08K 5/5419 | (2006.01) | |
| C08F 2/50 | (2006.01) | |
| C08F 20/28 | (2006.01) | |
| C09D 5/16 | (2006.01) | |
| C09D 175/16 | (2006.01) | |
| C09D 7/40 | (2018.01) | |
| C08G 18/50 | (2006.01) | |
| C08G 18/67 | (2006.01) | |
| C08G 18/75 | (2006.01) | |
| C08G 18/81 | (2006.01) | |
| C08G 65/22 | (2006.01) | |
| C08G 18/44 | (2006.01) | |
| C08G 77/18 | (2006.01) | |
| C08G 77/20 | (2006.01) | |

(52) U.S. Cl.
CPC .............. *C08F 20/28* (2013.01); *C08G 18/44* (2013.01); *C08G 18/5015* (2013.01); *C08G 18/672* (2013.01); *C08G 18/758* (2013.01); *C08G 18/8116* (2013.01); *C08G 65/226* (2013.01); *C08G 77/18* (2013.01); *C08G 77/20* (2013.01); *C08K 5/5419* (2013.01); *C08L 33/08* (2013.01); *C08L 33/10* (2013.01); *C08L 75/16* (2013.01); *C09D 5/16* (2013.01); *C09D 7/40* (2018.01); *C09D 175/16* (2013.01); *C08F 2500/01* (2013.01)

(58) Field of Classification Search
CPC ...... C08G 65/226; C08G 77/18; C08G 77/20; C08G 81/024; C08L 75/16; C08L 71/02; C08L 33/08; C08L 33/10; B32B 27/30; B32B 27/40; C08F 20/28; C08F 2500/01; C08F 2/50; C08K 5/5419; C09D 175/16; C09D 5/16; C09D 7/40

USPC ................... 428/423.3, 425.5; 525/453, 479
See application file for complete search history.

(56) References Cited

U.S. PATENT DOCUMENTS

| | | | |
|---|---|---|---|
| 2011/0086221 A1* | 4/2011 | Pokorny | .................... C09J 7/29 428/336 |
| 2013/0258482 A1* | 10/2013 | Takahashi | ............... G02B 1/111 359/601 |
| 2013/0319522 A1* | 12/2013 | Koike | ............... H01L 31/02366 136/256 |
| 2014/0113115 A1* | 4/2014 | Ito | ............................. B32B 7/06 428/201 |

FOREIGN PATENT DOCUMENTS

| | | |
|---|---|---|
| EP | 2311899 | 4/2011 |
| JP | 2008-539107 | 11/2008 |
| JP | 2009-197071 | 9/2009 |
| JP | 2014-100811 | 6/2014 |
| JP | 2014-166748 | 9/2014 |
| JP | 2014-167099 | 9/2014 |
| WO | 0148051 | 7/2001 |
| WO | 2010016452 | 2/2010 |

OTHER PUBLICATIONS

"Search Report of Europe Counterpart Application", dated Aug. 14, 2018, p. 1-6.
"Office Action of Russia Counterpart Application," with English translation thereof, dated Apr. 5, 2019, p. 1-12.
"Office Action of China Counterpart Application," with English translation thereof, dated Jun. 21, 2019, p. 1-p. 16.

\* cited by examiner

COATING AGENT, COATING FILM, LAMINATE AND SURFACE-PROTECTED ARTICLE

CROSS-REFERENCE TO RELATED APPLICATION

This application is a 371 application of the International PCT application serial no. PCT/JP2016/060270, filed on Mar. 29, 2016, which claims the priority benefit of Japan application no. 2015-074274, filed on Mar. 31, 2015. The entirety of each of the abovementioned patent applications is hereby incorporated by reference herein and made a part of this specification.

TECHNICAL FIELD

The invention relates to a coating agent. In particular, the invention relates to a coating agent that can be formed into a laminate having excellent self-restoring properties and stain-proof properties by applying the coating agent onto a base material and curing the resulting material.

BACKGROUND ART

Thermoplastic polyurethane (TPU) having high impact-resistant strength has been so far used as a base material for a protection film or the like. In particular, in Europe and the United States, a film for protecting a body of a vehicle from stone bouncing, a scratch or the like has been widely prevailing under the name of a paint protection film (PPF). For example, Scotchgard Paint Protection Film made by 3M Company is available.

As a protection film using thermoplastic polyurethane, Patent literature No. 1 discloses a multilayer film used for protecting a surface, particularly, a film used for protecting a surface (for example, a coated surface) of a vehicle (such as an automobile, an aircraft and a ship), and more specifically, a multilayer protection film prepared by processing a back by a pressure-sensitive adhesive and having a polyurethane layer in an uppermost part of a thermoplastic polyurethane layer (paragraph 0001). A painted surface of a body part of the vehicle is protected by the multilayer protection film An object of the protection films is typically to protect the surface of an article from an external element to prevent the article from being scratched. In recent years, requirements have been further expressed on the protection film that protects the article, and additionally has self-restoring properties of smoothening a scratch of the protection film itself even when the protection film is scratched, and stain-proof properties for preventing attachment of stains.

CITATION LIST

Patent Literature

Patent literature No. 1: JP 2008-539107

SUMMARY OF INVENTION

Technical Problem

Then, the invention is contemplated for providing a coating agent that can be formed into a laminate having excellent self-restoring properties and stain-proof properties by applying the coating agent onto a surface of a base material (for example, thermoplastic polyurethane) and curing the resulting material.

Solution to Problem

The present inventors have diligently continued to study in order to solve the problems described above. As a result, the present inventors have found that a surface layer formed of a coating agent containing urethane (meth)acrylate-based resin (a) and fluorine-based compound (b) having a polymerizable functional group has excellent self-restoring properties, stain-proof properties and stretchability by a combination of the urethane (meth)acrylate-based resin and the fluorine-based compound, and have completed the invention.

A coating agent according to a first aspect of the invention contains urethane (meth)acrylate-based resin (a), fluorine-based compound (b) and photopolymerization initiator (d), wherein urethane (meth)acrylate-based resin (a) has weight average molecular weight (Mw) of 10,000 to 800,000, and fluorine-based compound (b) has at least two polymerizable functional groups.

If the coating agent is thus configured, the coating agent that can be formed into a surface layer having excellent self-restoring properties of a scratch, stain-proof properties and stretchability is formed. More specifically, if the coating agent is applied onto a base material film or the like to form a coating film (before curing), fluorine-based compound (b) is accumulated on the surface of the layer (see fc in FIG. 1). Further, when the coating film is cured, urethane (meth)acrylate-based resin (a) and fluorine-based compound (b) having the polymerizable functional group are crosslinked to each other. The thus formed surface layer is immobilized by crosslinking into a product that can suppress infiltration of stains, has excellent stain-proof properties, and prevent bleed-out to improve durability of the stain-proof properties, and further has excellent self-restoring properties of a scratch and stretchability by flexibility of urethane (meth)acrylate-based resin (a).

A coating agent according to a second aspect of the invention is a material in which, in the coating agent according to the first aspect of the invention, the fluorine-based compound (b) is perfluoropolyether having a (meth)acryloyl group. A term "(meth)acryloyl group" refers to an acryloyl group or a methacryloyl group.

If the coating agent is thus configured, crosslinking between urethane (meth)acrylate-based resin (a) and fluorine-based compound (b) can be easily formed by a radically polymerizable (meth)acryloyl group.

A coating agent according to a third aspect of the invention contains, in the coating agent according to the first or second aspect, 1 to 9% by weight of fluorine-based compound (b) based on a total amount of urethane (meth)acrylate-based resin (a) and fluorine-based compound (b).

If the coating agent is thus configured, the coating agent that contains urethane (meth)acrylate-based resin (a) and fluorine-based compound (b) in a suitable proportion, and can be formed into the surface layer having particularly excellent self-restoring properties, stain-proof properties and stretchability is formed.

A coating agent according to a fourth aspect of the invention is a material further containing fluorosilsesquioxane derivative (c), in the coating agent according to any one of the first to third aspects of the invention, wherein fluorosilsesquioxane derivative (c) has at least one polymerizable functional group.

If the coating agent is thus configured, the coating agent that can be formed into the surface layer having further improved stain-proof properties and excellent slipperiness is formed.

A coating agent according to a fifth aspect of the invention is a material in which, in the coating agent according to the fourth aspect of the invention, fluorosilsesquioxane derivative (c) is cage structure fluorosilsesquioxane.

If the coating agent is thus configured, the cage structure fluorosilsesquioxane has properties according to which the fluorosilsesquioxane is further easily accumulated in an interface with air, and upon applying the coating agent onto the base material film or the like, a speed at which the fluorosilsesquioxane is accumulated in the interface with air can be increased.

A coating agent according to a sixth aspect of the invention contains, in the coating agent according to the fourth or fifth aspect of the invention, 0.1 to 10% by weight of fluorosilsesquioxane derivative (c) based on a total amount of the urethane (meth)acrylate-based resin (a), the fluorine-based compound (b) and the fluorosilsesquioxane derivative (c).

If the coating agent is thus configured, the coating agent that contains urethane (meth)acrylate-based resin (a), fluorine-based compound (b) and fluorosilsesquioxane derivative (c) in a suitable proportion, and can be formed into the surface layer having excellent self-restoring properties, stain-proof properties, stretchability and slipperiness is formed.

A coating film according to a seventh aspect of the invention is the coating film obtained by curing the coating agent according to any one of the first to sixth aspects of the invention.

If the coating agent is thus configured, the cured coating film obtained is formed into the coating film having the self-restoring properties, the stain-proof properties, the stretchability and the slipperiness of the surface layer.

A laminate according to an eighth aspect of the invention, as shown in FIGS. 1 and 2, for example, has base material film 11 formed of thermoplastic polyurethane, and on a first surface side of base material film 11, surface layer 12 formed by curing the coating agent according to any one of the first to sixth aspects. In addition, a term "on a surface side" herein means that the surface layer may be laminated in contact with the surface, or may be laminated through other layers. In FIG. 1, s1 represent a surface and in FIG. 2, ss represent fluorosilsesquioxane derivative.

If the coating agent is thus configured, the laminate is formed into the laminate having the flexibility of the thermoplastic polyurethane of the base material film, in addition to the self-restoring properties, the stain-proof properties, the stretchability and the slipperiness of the surface layer.

A laminate according to a ninth aspect of the invention, in the laminate according to the eighth aspect of the invention, as shown in FIGS. 1 and 2, for example, has adhesive layer 13 on a side opposite to the first surface side of base material film 11, and release film 14 on a surface opposite to base material film 11 of adhesive layer 13, wherein the adhesive layer is composed of at least one resin selected from an acrylic resin, a urethane-based resin, a rubber-based resin and a silicone-based resin, and at least one release agent selected from a fluorine-based resin, a silicone resin and long chain-containing carbamate is applied onto a surface relative to the adhesive layer of the release layer.

If the coating agent is thus configured, the release film is easily peeled off from the adhesive layer.

A surface-protected article according to a tenth aspect of the invention has the laminate according to the eighth or ninth aspect, from which the release film is peeled off, and an article prepared by attaching, on a surface, the laminate from which the release film is peeled off, by the adhesive layer.

If the coating agent is thus configured, the surface can be protected from a scratch or the like by thermoplastic polyurethane having high impact strength. Moreover, even when the scratch is further formed on the surface layer serving as an outermost surface, self-restoration can be made, and the outermost surface further has excellent stain-proof properties, stretchability and slipperiness.

Advantageous Effects of Invention

According to a coating agent of the present application invention, a surface layer having excellent self-restoring properties of smoothening a scratch when the surface layer is scratched, and stain-proof properties of preventing attachment of stains can be formed on a base material film. As a result, when the base material film is formed of thermoplastic polyurethane, a laminate having excellent self-restoring properties and stain-proof properties in addition to flexibility of the thermoplastic polyurethane can be formed, and the laminate can protect a surface of an article as an adherend.

DESCRIPTION OF EMBODIMENTS

The present application is based on Japanese Patent Application No. 2015-074274 filed on Mar. 31, 2015, in Japan, and is hereby incorporated by reference in its entirety in the present application. The invention may be further completely understood by the detailed description described below. A further application scope of the invention will become apparent by the detailed description described below. However, the detailed description and a specific embodiment are desirable embodiments of the invention, and described only for illustrative purposes because various possible changes and modifications will be apparent to those having ordinary skill in the art on the basis of the detailed description within spirit and the scope of the invention. The applicant has no intention to dedicate to the public any described embodiment, and among the modifications and alternatives, those which may not literally fall within the scope of the present claims constitute a part of the invention in the sense of the doctrine of equivalents.

Hereinafter, an embodiment of the invention will be described with reference to drawings. In addition, in each Figure, an identical or similar sign is placed on apart identical or corresponding to each other, and overlapped description is omitted. Moreover, the invention is not limited by the embodiments described below.

Coating Agent

Figure 1:
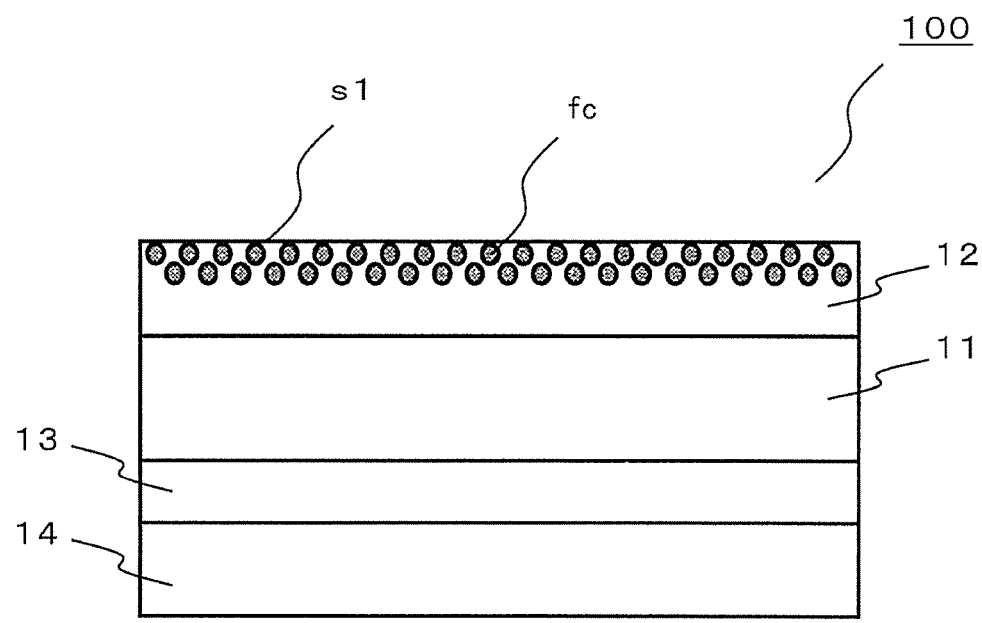
FIG. 1 is a diagram showing a layer structure of laminate 100 according to a second embodiment of the invention.

A coating agent according to a first embodiment of the present application contains urethane (meth)acrylate-based resin (a), fluorine-based compound (b) and photopolymerization initiator (d), in which urethane (meth)acrylate-based resin (a) has weight average molecular weight (Mw) of 10,000 to 800,000, and fluorine-based compound (b) has at least two polymerizable functional groups. For example, as shown in FIG. 1, if the coating agent is applied onto base material film 11 and the resulting material is cured thereon, surface layer 12 having excellent self-restoring properties, stain-proof properties and stretchability can be formed.

In addition, the coating agent may further contain fluorosilsesquioxane derivative (c). Fluorosilsesquioxane derivative (c) has at least one polymerizable functional group. The stain-proof properties of the surface layer can be improved by fluorosilsesquioxane derivative (c), and simultaneously the surface layer can be provided with excellent slipperiness.

In addition, the coating agent may further contain solvent (e) and additive (f).

Urethane (Meth)Acrylate-Based Resin (a)

Urethane (meth)acrylate-based resin (a) has a (meth) acryloyl group, and is an active energy ray-curable resin having a urethane skeleton, and specific examples thereof include an ultraviolet-curable resin. Urethane (meth)acrylate-based resin (a) provides the surface layer with flex (flexibility).

Urethane (meth)acrylate-based resin (a) may be a radically polymerizable unsaturated group-containing oligomer, prepolymer or polymer that can be obtained by allowing an organic isocyanate-based compound (polyisocyanate) having a plurality of isocyanate groups in one molecule to react with a polyol-based compound (polyhydroxy compound or polyhydric alcohols) having two or more hydroxy groups, and then allowing the resulting reaction mixture to react with a hydroxy group-containing (meth)acrylate-based compound.

In particular, polycarbonate-based urethane (meth)acrylate using polycarbonate polyol as the polyhydroxy compound is preferred. The formed surface layer can be provided with excellent elasticity and toughness by using the polycarbonate-based urethane (meth)acrylate.

Alternatively, polyester-based urethane (meth)acrylate using polyester polyol is also preferred as the polyhydroxy compound. The formed surface layer can be provided with the excellent elasticity and toughness by using the polyester-based urethane (meth)acrylate.

Specific examples of the polyisocyanate include 2,4-tolylene diisocyanate and an isomer thereof, diphenylmethane diisocyanate, hexamethylene diisocyanate, hydrogenated xylylene diisocyanate, isophorone diisocyanate, xylylene diisocyanate, dicyclohexylmethane diisocyanate, naphthalene diisocyanate, triphenylmethane triisocyanate, Burnock D-750 (trade name; made by DIC Corporation), Crisvon NK (trade name; made by DIC Corporation), Desmodur L (trade name; made by Sumitomo Bayer Urethane Co., Ltd.), Coronate L (trade name; made by Nippon Polyurethane Industry Co., Ltd.), Takenate D102 (trade name; made by Mitsui Takeda Chemicals, Inc.) and Isonate 143L (trade name; made by Mitsubishi Chemical Corporation).

Examples of the polyhydroxy compound include polycarbonate polyol, polyester polyol, polyether polyol and polycaprolactone polyol, and specific examples thereof include a glycerol-ethylene oxide adduct, a glycerol-propylene oxide adduct, a glycerol-tetrahydrofuran adduct, a glycerol-ethylene oxide propylene oxide adduct, a trimethylolpropane-ethylene oxide adduct, a trimethylolpropane-propylene oxide adduct, a trimethylolpropane-tetrahydrofuran adduct, a trimethylolpropane-ethylene oxide-propylene oxide adduct, a dipentaerythritol ethylene oxide adduct, a dipentaerythritol-propylene oxide adduct, a dipentaerythritol-tetrahydrofuran adduct and a dipentaerythritol-ethylene oxide-propylene oxide adduct.

Specific examples of the polyhydric alcohols include ethylene glycol, diethylene glycol, triethylene glycol, polyethylene glycol, propylene glycol, dipropylene glycol, polypropylene glycol, 2-methyl-1,3-propanediol, 1,3-butanediol, an adduct of bisphenol A and propylene oxide or ethylene oxide, 1,2,3,4-tetrahydroxybutane, glycerol, trimethylolpropane, 1,2-cyclohexaneglycol, 1,3-cyclohexaneglycol, 1,4-cyclohexaneglycol, para-xylene glycol, bicyclohexyl-4,4-diol, 2,6-decalin glycol and 2,7-decalin glycol.

The hydroxy group-containing (meth)acrylate-based compound is not particularly limited, but hydroxy group-containing (meth)acrylate is preferred, and specific examples thereof include 2-hydroxyethyl (meth)acrylate, 2-hydroxypropyl (meth)acrylate, 3-hydroxybutyl (meth) acrylate, polyethyleneglycol mono(meth)acrylate, polypropylene glycol mono(meth)acrylate, di(meth)acrylate of tris (hydroxyethyl)isocyanuric acid and pentaerythritol (meth) acrylate.

Urethane (meth)acrylate-based resin (a) can be synthesized by a publicly known method. As one example, urethane (meth)acrylate-based resin (a) can be obtained by allowing a predetermined amount of organic polyisocyanate (a-1) to react with a predetermined amount of polycarbonate polyol (a-2) under conditions of 70° C. to 80° C. until a remaining isocyanate concentration reaches a predetermined amount, and then adding (meth)acrylate (a-3) containing one or more hydroxy groups in a predetermined amount of molecules to the resulting mixture, and allowing the resulting mixture to react therewith in the presence of a polymerization inhibitor (for example, hydroquinone monomethyl ether) at a temperature of 70° C. to 80° C. until the remaining isocyanate concentration reaches 0.1% by weight or less.

Weight average molecular weight (Mw) of urethane (meth)acrylate-based resin (a) is in the range of 10,000 to 800,000, and preferably 50,000 to 500,000. The surface layer can be provided with flexibility by adjusting the weight average molecular weight (Mw) to the range. When the weight average molecular weight (Mw) is 10,000 or more, crosslinking density in the surface layer is not excessively increased.

Fluorine-Based Compound (b)

If fluorine-based compound (b) has at least two polymerizable functional groups, any of a monomer, an oligomer, a prepolymer and a polymer may be applied. Specific examples of fluorine-based compound (b) include perfluoropolyether having a (meth)acryloyl group. In addition, when the fluorine-based compound (b) is referred to in the present application, the statement does not include fluorosilsesquioxane derivative (c) described below.

Specific examples of the perfluoropolyether include a compound having a structure in which a divalent fluorocarbon group having 1 to 3 carbons and an oxygen atom are alternately connected. As the divalent fluorocarbon group having 1 to 3 carbons, one kind or a combination of two or more kinds may be applied.

Specific examples of a chain of the perfluoropolyether include the chain represented by formula (1).

Formula 1

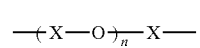

(1)

In formula (1), X is a chain represented by formulas (1-1) to (1-5) each below. Moreover, X may be a chain of one kind of any of formulas (1-1) to (1-5), or may be a chain having two or more kinds of formulas (1-1) to (1-5). Specific examples of a structure having two or more kinds of formulas (1-1) to (1-5) include such a structure as represented by —(CF$_2$CF$_2$—O)$_n$—(CF$_2$—O)$_n$—. When the chain includes two or more kinds of the structures represented by formulas (1-1) to (1-5) as the X, the chain may have a random struction or a block structure consisting of a structure unit of —(X—O)—. Moreover, n is an integer of 2 to 200 representing a repeating unit.

Formula 2

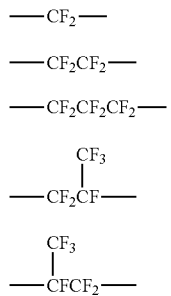

Fluorine-based compound (b) preferably has polymerizable functional groups at least at both terminals. The polymerizable functional group is not particularly limited as long as the group is radically polymerized, and specific examples thereof includes methacryloyl, acryloyl, allyl, styryl, α-methylstyryl, vinyl, vinyl ether, vinyl ester, acrylamide, methacrylamide, N-vinylamide, maleate, fumarate and N-substituted maleimide, and above all, a group containing (meth)acryl or styryl is preferred. "(Meth)acryl" herein is a generic term for acryl and methacryl, and means acryl and/or methacryl.

Fluorine-based compound (b) can be synthesized by a publicly known method.

A content of fluorine-based compound (b) is preferably 1 to 9% by weight, and further preferably 1 to 7% by weight, based on a total amount of urethane (meth)acrylate-based resin (a) and fluorine-based compound (b). If the content is 1% by weight or more, the surface layer can be sufficiently provided with the stain-proof properties, and if the content is 9% by weight or less, reduction of flexibility of the surface layer and deterioration in the self-restoring properties thereof can be avoided.

Fluorosilsesquioxane Derivative (c)

If fluorosilsesquioxane derivative (c) has at least one polymerizable functional group, any of a monomer, an oligomer, a prepolymer and a polymer may be applied.

Fluorosilsesquioxane Monomer

"Silsesquioxane" is a generic term for polysiloxane represented by [(R—SiO$_{1.5}$)n] (R is any substituent). A structure of the silsesquioxane is generally classified into a random structure, a rudder structure and a cage structure according to an Si—O—Si skeleton thereof. Further, the cage structure is classified into T8, T10, T12 types and the like according to the number of Si contained therein.

The fluorosilsesquioxane only needs have properties according to which the fluorosilsesquioxane is easily accumulated in an interface between air and a solid (or liquid) under a hydrophobic atmosphere (for example, in air). If the fluorosilsesquioxane accumulated in the interface is applied, an effect of the present application invention can be sufficiently exhibited. Surface modification of surface layer 12 can be performed in a small amount and effectively by such excellent surface accumulation properties of the fluorosilsesquioxane.

One example of the fluorosilsesquioxane includes fluorosilsesquioxane having a molecular structure represented by formula (2).

Formula 3

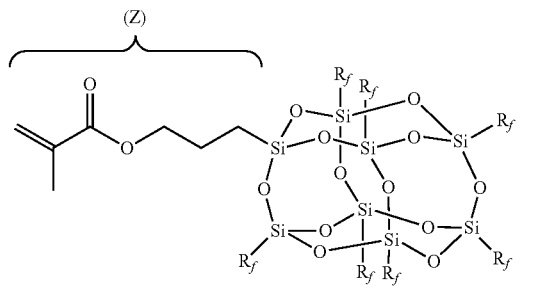

R$_f$: —C$_2$H$_4$CF$_3$

More specifically, among the random structure, the rudder structure and the cage structure, each being the structure of the silsesquioxane, the silsesquioxane particularly preferably has the cage structure. If the cage structure fluorosilsesquioxane is used, a speed at which the fluorosilsesquioxane is accumulated in the interface can be increased in comparison with the speed of other structure fluorosilsesquioxane.

In consideration of ease of availability, silsesquioxane is preferably of any one of types of T8, T10 and T12.

Substituent (R) in the formula [(R—SiO$_{1.5}$)n] described above is preferably fluoroalkyl group (R$_f$). In consideration of solubility in the solvent, the number of carbon atoms of R$_f$ is preferably 1 to 8. R$_f$ may be a linear group or a branched group. Specific examples of the liner group include —CH$_2$CH$_2$CF$_3$, —CH$_2$CH$_2$CF$_2$CF$_3$, —CH$_2$CH$_2$CF$_2$CF$_2$CF$_3$, —CH$_2$CH$_2$CF$_2$CF$_2$CF$_2$CF$_3$, —CH$_2$CH$_2$CF$_2$CF$_2$CF$_2$CF$_2$CF$_3$ and —CH$_2$CH$_2$CF$_2$CF$_2$CF$_2$CF$_2$CF$_2$CF$_3$, and specific examples of the branched group include —CH$_2$CH$_2$CF(CF$_3$)$_2$, —CH$_2$CH(CF$_3$) CF$_2$CF$_3$, —CH(CF$_3$)CH$_2$CF$_2$CF$_3$, —CH$_2$C (CF$_3$)$_2$CF$_3$, —C(CF$_3$)$_2$CH$_2$CF$_3$—CH$_2$CH$_2$CF(CF$_3$)$_2$, —CH$_2$CH$_2$CF(CF$_3$)CF$_2$CF$_3$ and —CH$_2$CH$_2$C(CF$_3$)$_2$CF$_3$. In addition, R$_f$ may be a group different from each other or an identical group for all.

In formula (2), the fluorosilsesquioxane having "3-(methacryloyloxy)propyl" in one piece of Si is illustrated, but the group is not limited to the polymerizable functional group. For example, when a position of "3-(methacryloyloxy) propyl" is taken as Z, a group in the position can be replaced by any other functional group. Specifically, as Z, any group may be applied from hydrogen, a hydroxy group, alkenyl, or halogen (chlorine, bromine, iodine), alkoxy, phenoxy, polyalkyleneoxy, —COOH, 2-oxapropane-1,3diol, alkoxycarbonyl, alkenyloxycarbonyl, oxiranyl, 3,4-epoxycyclohexyl, oxetanyl, oxetanylene, —NH—, —NH$_2$, —CN, —NCO, alkynyl, cycloalkenyl, acryloyloxy, methacryloyloxy, urethane acryloyl, urethane methacryloyl, —SH and —PH$_2$. Further, as Z, the groups (hydrogen to PH$_2$) through alkylene may be applied. Alkylene to be bound with Si is not particularly limited, but alkylene having 1 to 8 carbons is preferred, and propylene in which the number of carbons is 3 is particularly preferred. However, a group having alkanoloxy, a group having halogenated sulfonyl and a group having an α-haloester group are not included in the selection range.

However, fluorosilsesquioxane having at least two polymerizable functional groups to be bound with Si is particularly preferably applied. For example, in formula (2), the fluorosilsesquioxane having "3-(methacryloyloxy)propyl" in one piece of Si is illustrated, but fluorosilsesquioxane having "3-(methacryloyloxy)propyl" in other one or more pieces of Si is further preferably applied. Further, the polymerizable functional group is preferably a radically polymerizable functional group.

Fluorosilsesquioxane Oligomer, Prepolymer and Polymer

Hereinafter, a fluorosilsesquioxane oligomer, prepolymer and polymer are referred to as a fluorosilsesquioxane polymer as a whole.

The fluorosilsesquioxane polymer, when the functional group is the polymerizable group, can be formed into a homopolymer of fluorosilsesquioxane, or a copolymer with any other general monomer (for example, an addition-polymerizable monomer), or may be formed into a copolymer of fluorosilsesquioxane having different polymerizable groups with each other. On the above occasion, as a polymerizing method, any of publicly known methods can be adopted. Thus, the fluorosilsesquioxane used in the coating agent according to the present application may be the fluorosilsesquioxane polymer.

However, the fluorosilsesquioxane polymer after polymerization has at least one polymerizable functional group. Further, the polymerizable functional group is preferably the radically polymerizable functional group.

More specifically, the fluorosilsesquioxane represented by formula (2) may have, as Z, the addition-polymerizable functional group, or may have, as Z, the addition-polymerizable functional group through alkylene. Specific examples of the addition-polymerizable functional group include a group having a radically polymerizable functional group of a terminal olefin type or an internal olefin type; a group having a cationic polymerizable functional group, such as vinyl ether and propenyl ether; and a group having an anionic polymerizable functional group, such as vinylcarboxyl and cyanoacryloyl, but preferably include a radically polymerizable functional group.

The radically polymerizable functional group is not particularly limited as long as the group is radically polymerized, and specific examples thereof include methacryloyl, acryloyl, allyl, styryl, α-methylstyryl, vinyl, vinyl ether, vinyl ester, acrylamide, methacrylamide, N-vinylamide, maleate, fumarate and N-substituted maleimide, and above all, a group containing (meth)acryl or styryl is preferred. "(Meth)acryl herein is a generic term for acryl and methacryl, and means acryl and/or methacryl.

Specific examples of the radically polymerizable functional group having (meth)acryl described above include a group represented by formula (3). In formula (3), Y¹ represents alkylene having 2 to 10 carbons, preferably alkylene having 2 to 6 carbons, and further preferably propylene. Moreover, X represents hydrogen or alkyl having 1 to 3 carbons, and preferably hydrogen or methyl.

Moreover, specific examples of the radically polymerizable functional group having styryl described above include a group represented by formula (4) below. In formula (4), Y² represents a single bond or alkylene having 1 to 10 carbons, preferably a single bond or alkylene having 1 to 6 carbons, and further preferably a single bond or ethylene. Moreover, vinyl is bound to any of carbons of a benzene ring, and preferably bound to carbon in a para position relative to Y².

Formula 4

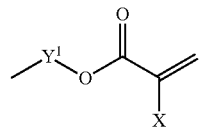

(3)

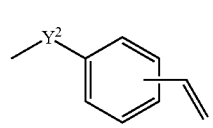

(4)

The addition-polymerizable monomer includes a monomer having a crosslinkable functional group and a monomer having no crosslinkable functional group. The addition-polymerizable monomer having the crosslinkable functional group only needs be a compound having one or two or more addition-polymerizable double bonds, and may be any of a vinyl compound, a vinylidene compound and a vinylene compound, for example, and specific examples thereof include a (meth)acrylic compound or a styrene compound.

Specific examples of the (meth)acrylic compound include (meth)acrylic acid, (meth)acrylate, and also (meth)acrylamide and (meth)acrylonitrile.

Specific examples of the (meth)acrylic compound of the addition-polymerizable monomer include (meth)acrylate having a crosslinkable functional group. Specific examples of such a crosslinkable functional group include epoxy such as glycidyl and epoxycyclohexyl, oxetanyl, isocyanato, acid anhydride, carboxyl, and hydroxyl, but preferably epoxy such as glycidyl, or oxetanyl. Specific examples of the (meth)acrylate having the crosslinkable functional group include (meth)acrylic acid, hydroxyalkyl (meth)acrylate such as 2-hydroxyethyl (meth)acrylate and 2-hydroxypropyl (meth)acrylate; epoxy-containing (meth)acrylate such as glycidyl (meth)acrylate; alicyclic epoxy-containing (meth) acrylate such as 3,4-epoxycyclohexylmethyl (meth)acrylate; oxetanyl-containing (meth)acrylate such as 3-ethyl-3-(meth) acryloyloxymethyl oxetane; 2-(meth)acryloyloxyethyl isocyanate; γ-(methacryloyloxypropyl)trimethoxysilane; (meth)acrylate-2-aminoethyl, 2-(2-bromopropionyloxy) ethyl (meth)acrylate, 2-(2-bromoisobutyryloxy)ethyl (meth) acrylate; 1-(meth)acryloxy-2-phenyl-2-(2,2,6,6-tetramethyl-1-piperidin yloxy)ethane, 1-(4-(4-(meth)acryloxy) ethoxyethyl)phenylethoxy)piperidine, 1,2,2,6,6-pentamethyl-4-piperidyl (meth)acrylate and 2,2,6,6-pentamethyl-4-piperidyl (meth)acrylate.

Specific examples of the styrene compound having one addition-polymerizable double bond include a styrene compound having a crosslinkable functional group. Specific examples of such a crosslinkable functional group include epoxy such as glycidyl, oxetanyl, halogen, amino, isocyanato, acid anhydride, carboxyl, hydroxyl, thiol and siloxy.

Specific examples of the styrene compound having the crosslinkable functional group include o-aminostyrene, p-styrene chlorosulfonic acid, styrene sulfonic acid and a salt thereof, vinylphenylmethyldithiocarbamate, 2-(2-bromopropionyloxy)styrene, 2-(2-bromoisobutyryloxy)styrene, 1-(2-(4-vinylphenyl)methoxy)-1-phenylethoxy)-2,2,6,6-tetramethylpiperidine, and a compound represented by formulas described below.

Formula 5

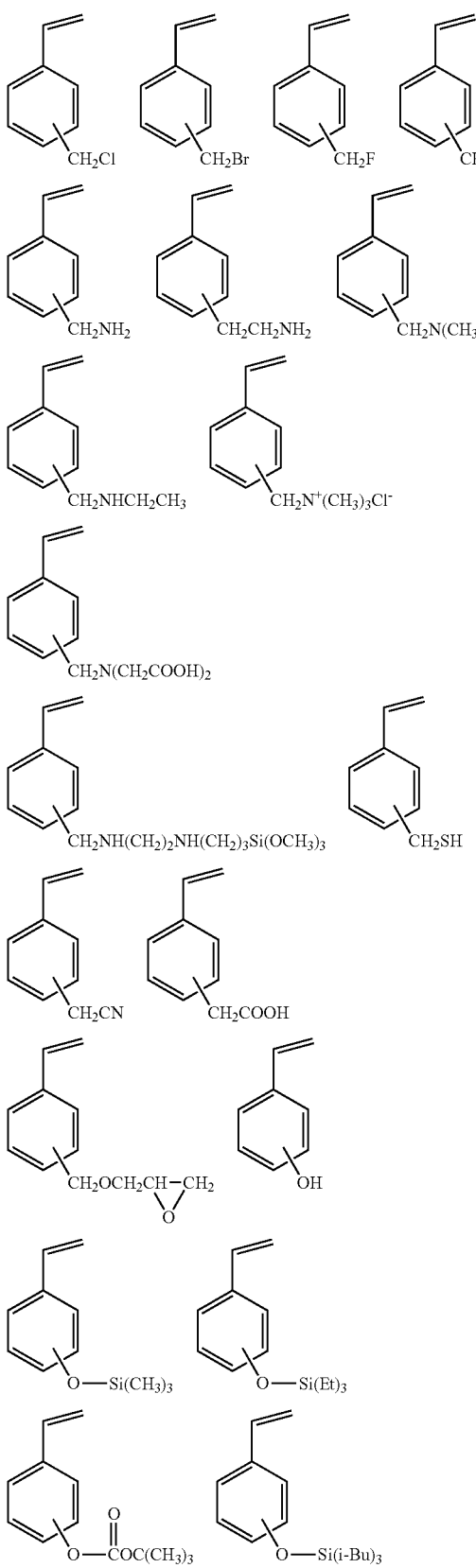

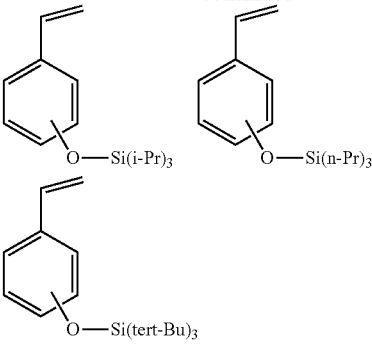

In addition to the addition-polymerizable monomer, in order to control compatibility with a curable resin, leveling properties, an amount of the crosslinkable functional group in the copolymer, and the like, an addition-polymerizable monomer other than the addition-polymerizable monomer described above can be simultaneously used when necessary.

Specific examples of the addition-polymerizable monomer having no crosslinkable functional group include a (meth)acrylic compound having one addition-polymerizable double bond and no crosslinkable functional group, and a styrene compound having one addition-polymerizable double bond and no crosslinkable functional group. Specific examples of such a (meth)acrylic compound include alkyl (meth)acrylate such as methyl (meth)acrylate, ethyl (meth)acrylate, n-propyl (meth)acrylate, isopropyl (meth)acrylate, butyl (meth)acrylate, isobutyl (meth)acrylate, t-butyl (meth)acrylate, n-pentyl (meth)acrylate, n-hexyl (meth)acrylate, cyclohexyl (meth)acrylate, n-heptyl (meth)acrylate, n-octyl (meth)acrylate, 2-ethylhexyl (meth)acrylate, nonyl (meth)acrylate, decyl (meth)acrylate, dodecyl (meth)acrylate and stearyl (meth)acrylate; aryl (meth)acrylate such as phenyl (meth)acrylate and toluyl (meth)acrylate; arylalkyl (meth)acrylate such as benzyl (meth)acrylate; alkoxyalkyl (meth)acrylate such as 2-methoxyethyl (meth)acrylate, 3-methoxypropyl (meth)acrylate and 3-methoxybutyl (meth)acrylate; and an ethyleneoxide adduct of (meth)acrylic acid.

Specific examples of the (meth)acrylic compound having one addition-polymerizable double bond and no crosslinkable functional group further include fluoroalkyl (meth)acrylate such as trifluoromethylmethyl (meth)acrylate, 2-trifluoromethylethyl (meth)acrylate, 2-perfluoroethylethyl (meth)acrylate, 2-perfluoroethyl-2-perfluorobutylethyl (meth)acrylate, perfluoroethyl (meth)acrylate, trifluoromethyl (meth)acrylate, diperfluoromethylmethyl (meth)acrylate, 2-perfluoromethyl-2-perfluoroethylethyl (meth)acrylate, 2-perfluorohexylethyl (meth)acrylate, 2-perfluorodecylethyl (meth)acrylate and 2-perfluorohexadecylethyl (meth)acrylate.

Further, specific examples of the (meth)acrylic compound having one addition-polymerizable double bond and no crosslinkable functional group include a (meth)acrylic compound having a silsesquioxane skeleton. Specific examples of such a (meth)acrylic compound having the silsesquioxane skeleton include 3-(3,5,7,9,11,13,15-heptaethylpentacyclo[9.5.1.1$^{3,9}$.1$^{5,15}$.1$^{7,13}$]octasiloxane-1-yl)propyl (meth)acrylate, 3-(3,5,7,9,11,13,15-heptaisobutyl-pentacyclo[9.5.1.1$^{3,9}$.1$^{5,15}$.1$^{7,13}$]octasiloxane-1-yl)propyl (meth)acrylate, 3-(3,5,7,9,11,13,15-heptaisooctylpentacyclo[9.5.1.1$^{3,9}$.1$^{5,15}$.1$^{7,13}$]octasiloxane-1-yl)propyl (meth)acrylate, 3-(3,5,7,9,11,13,15-heptacyclopentylpentacyclo [9.5.1.1$^{3,9}$.

1$^{5,15}$.1$^{7,13}$]octasiloxane-1-yl)propyl (meth)acrylate, 3-(3,5, 7,9,11,13,15-heptaphenylpentacyclo[9.5.1.1$^{3,9}$.1$^{5,15}$.1$^{7,13}$] octasiloxane-1-yl)propyl (meth)acrylate, 3-[(3,5,7,9,11,13, 15-heptaethylpentacyclo[9.5.1.1$^{3,9}$.1$^{5,15}$.1$^{7,13}$]octasiloxane-1-yloxy)dimethylsilyl]propyl (meth)acrylate, 3-[(3,5,7,9,11, 13,15-heptaisobutylpentacyclo[9.5.1.1$^{3,9}$.1$^{5,15}$. 1$^{7,13}$] octasiloxane-1-yloxy)dimethylsilyl]propyl (meth)acrylate, 3-[(3,5,7,9,11,13,15-heptaisooctylpentacyclo[9.5.1.1$^{3,9}$. 1$^{5,15}$. 1$^{7,13}$]octasiloxane-1-yloxy)dimethylsilyl]propyl (meth)acrylate, 3-[(3,5,7,9,11,13,15-heptacyclopentylpentacyclo[9.5.1.1$^{3,9}$.1$^{5,15}$.1$^{7,13}$]octasiloxane-1-yloxy)dimethylsilyl]propyl (meth)acrylate and 3-[(3,5,7,9,11,13,15-heptaphenylpentacyclo[9.5.1.1$^{3,9}$.1$^{5,15}$.1$^{7,13}$]octasiloxane-1-yloxy)dimethylsilyl]propyl (meth)acrylate. Specific examples of the styrene compound having one addition-polymerizable double bond and no crosslinkable functional group include styrene, vinyltoluene, α-methylstyrene and p-chlorostyrene.

Specific examples of the styrene compound having one addition-polymerizable double bond and no crosslinkable functional group further include a styrene compound containing silsesquioxane. Specific examples of such a styrene derivative containing the silsesquioxane include octasiloxane (T8 silsesquioxane) having a 4-vinylphenyl group, such as 1-(4-vinylphenyl)-3,5,7,9,11,13,15-heptaethylpentacyclo [9.5.1.1$^{3,9}$.1$^{5,15}$.1$^{7,13}$]octasiloxane, 1-(4-vinylphenyl)-3,5,7, 9,11,13,15-heptaisobutylpentacyclo[9.5.1.1$^{3,9}$.1$^{5,15}$.1$^{7,13}$] octasiloxane, 1-(4-vinylphenyl)-3,5,7,9,11,13,15-heptaisooctylpentacyclo[9.5.1.1$^{3,9}$.1$^{5,15}$.1$^{7,13}$]octasiloxane, 1-(4-vinylphenyl)-3,5,7,9,11,13,15-heptacyclopentylpentacyclo[9.5.1.1$^{3,9}$.1$^{5,15}$.1$^{7,13}$]octasiloxane and 1-(4-vinylphenyl)-3,5,7,9,11,13,15-heptaphenylpentacyclo [9.5.1.1$^{3,9}$.1$^{5,15}$.1$^{7,13}$]octasiloxane; and octasiloxane (T8 type silsesquioxane) having a 4-vinylphenylethyl group, such as 3-(3,5,7,9,11,13,15-heptaethylpentacyclo[9.5.1. 1$^{3,9}$.1$^{5,15}$.1$^{7,13}$]octasiloxane-1-yl)ethylstyrene, 3-(3,5,7,9, 11,13,15-heptaisobutylpentacyclo[9.5.1.1$^{3,9}$.1$^{5,15}$.1$^{7,13}$]octasiloxane-1-yl)ethylstyrene, 3-(3,5,7,9,11,13,15-heptaisooctylpentacyclo[9.5.1.1$^{3,9}$.1$^{5,15}$.1$^{7,13}$]octasiloxane-1-yl) ethylstyrene, 3-(3,5,7,9,11,13,15-heptacyclopentylpentacyclo[9.5.1.1$^{3,9}$.1$^{5,15}$.1$^{7,13}$] octasiloxane-1-yl)ethylstyrene, 3-(3,5,7,9,11,13,15-heptaphenylpentacyclo[9.5.1.1$^{3,9}$.1$^{5,15}$.1$^{7,13}$]octasiloxane-1-yl)ethylstyrene, 3-((3,5,7,9,11,13,15-heptaethylpentacyclo [9.5.1.1$^{3,9}$.1$^{5,15}$.1$^{7,13}$]octasiloxane-1-yloxy)dimethylsilyl) ethylstyrene, 3-((3,5,7,9,11,13,15-heptaisobutylpentacyclo [9.5.1.1$^{3,9}$.1$^{5,15}$. 1$^{7,13}$]octasiloxane-1-yloxy)dimethylsilyl) ethylstyrene, 3-((3,5,7,9,11,13,15-heptaisooctylpentacyclo [9.5.1.1$^{3,9}$.1$^{5,15}$. 1$^{7,13}$]octasiloxane-1-yloxy)dimethylsilyl) ethylstyrene, 3-((3,5,7,9,11,13,15-heptacyclopentylpentacyclo[9.5.1.1$^{3,9}$.1$^{5,15}$.1$^{7,13}$] octasiloxane-1-yloxy)dimethylsilyl)ethylstyrene and 3-((3, 5,7,9,11,13,15-heptaphenylpentacyclo[9.5.1.1$^{3,9}$.1$^{5,15}$.1$^{7,13}$] octasiloxane-1-yloxy)dimethylsilyl)ethylstyrene.

Further, specific examples of the addition-polymerizable monomer other than the addition-polymerizable monomer described above also include styrene, (meth)acrylate, siloxane and alkylene oxide, for example, a macromonomer having a main chain derived from ethyleneoxide, propyleneoxide or the like and having one polymerizable double bond.

Specific examples of the addition-polymerizable monomer also include a compound having two addition-polymerizable double bonds. Specific examples of the compound having two addition-polymerizable double bonds include a di(meth)acrylate-based monomer such as 1,3-butanediol=di (meth)acrylate, 1,4-butanediol=di(meth)acrylate, 1,6-hexandiol=di(meth)acrylate, polyethyleneglycol=di(meth) acrylate, diethyleneglycol=di(meth)acrylate, neopentylglycol=di(meth)acrylate, triethyleneglycol=di (meth)acrylate, tripropyleneglycol=di(meth)acrylate, hydroxypivalate neopentylglycol=di(meth)acrylate, trimethylolpropane=di(meth)acrylate, bis[(meth)acryloyloxyethoxy]bisphenol A, bis[(meth)acryloyloxyethoxy]tetrabromobisphenol A, bis[(meth)acryloxypolyethoxy]bisphenol A, 1,3-bis(hydroxyethyl)5,5-dimethylhydantoin, 3-methylpentanediol=di(meth)acrylate, di(meth)acrylate of a hydroxypivalate neopentylglycol compound and bis [((meth)acryloyloxypropyl]tetramethyldisiloxane; and divinylbenzene.

Further, specific examples thereof include styrene, (meth) acrylate, siloxane and alkylene oxide, for example, a macromonomer having a main chain derived from ethyleneoxide, propyleneoxide or the like and having two polymerizable double bonds.

Specific examples of the addition-polymerizable monomer also include a compound having three or more addition-polymerizable double bonds. Specific examples of the compound having three or more addition-polymerizable double bonds include trimethylolpropane=tri(meth)acrylate, pentaerythritol=tri(meth)acrylate, pentaerythritol=tetra (meth)acrylate, dipentaerythritol=monohydroxypenta(meth) acrylate, tris(2-hydroxyethylisocyanate)=tri(meth)acrylate, tris(diethyleneglycol)trimellitate=tri(meth)acrylate, 3,7,14-tris[(((meth)acryloyloxypropyl)dimethylsiloxy)]-1,3,5,7,9, 11,14-heptaethyltricyclo[7.3.3.1$^{5.11}$]heptasiloxane, 3,7,14-tris[(((meth)acryloyloxypropyl)dimethylsiloxy]-1,3,5,7,9, 11,14-heptaisobutyltricyclo[7.3.3.1$^{5.11}$]heptasiloxane, 3,7, 14-tris[(((meth)acryloyloxypropyldimethylsiloxy)]-1,3,5,7, 9,11,14-heptaisooctyltricyclo[7.3.3.1$^{5.11}$]heptasiloxane, 3,7, 14-tris[(((meth)acryloyloxypropyldimethylsiloxy]-1,3,5,7, 9,11,14-heptacyclopentyltricyclo[7.3.3.1$^{5.11}$]heptasiloxane, 3,7,14-tris[(((meth)acryloyloxypropyldimethylsiloxy]-1,3, 5,7,9,11,14-heptaphenyltricyclo[7.3.3.1$^{5}$.]heptasiloxane, octakis(3-(meth)acryloyloxypropyldimethylsiloxy)octasilsesquioxane and octakis(3-(meth)acryloyloxypropyl)octasilsesquioxane.

Further, specific examples thereof also include styrene, (meth)acrylate, siloxane and alkylene oxide, for example, a macromonomer having a main chain derived from ethyleneoxide, propyleneoxide or the like and having three or more polymerizable double bonds.

The addition-polymerizable monomer is preferably a (meth)acrylic compound, further preferably (meth)acrylate, and still further preferably lower alkyl (for example, 1 to 3 carbons) ester or ester having a crosslinkable functional group of (meth)acrylic acid, or the like.

The polymer is an addition polymer of fluorosilsesquioxane or an addition copolymer with any other addition-polymerizable monomer, and when the polymer is the copolymer, the polymer may be a sequence-ordered copolymer such as a block copolymer, or a random copolymer, but is preferably a random copolymer. Moreover, the polymer may have a crosslinked structure, or may be a graft copolymer.

A content of fluorosilsesquioxane derivative (c) is preferably 0.1 to 10% by weight, and further preferably 0.1 to 5% by weight, based on a total amount of urethane (meth) acrylate-based resin (a), fluorine-based compound (b) and fluorosilsesquioxane derivative (c). If the content is 0.1% by weight or more, the stain-proof properties of the surface layer can be improved and simultaneously the surface layer can be provided with the slipperiness, and if the content is 10% by weight or less, reduction of the flexibility of the surface layer and deterioration in the self-restoring properties thereof can be avoided.

Photopolymerization Initiator (d)

Photopolymerization initiator (d) is not particularly limited, and only needs be an initiator that generates a radical by an active energy ray. Specific examples thereof include alkylphenon-based photopolymerization initiator.

Specific examples of a compound used as the active energy ray polymerization initiator include 1-hydroxycyclohexylphenyl ketone, benzophenone, Michler's ketone, 4,4'-bis(diethylamino)benzophenone, xanthone, thioxanthone, isopropylxanthone, 2,4-diethylthioxanthone, 2-ethylanthraquinone, acetophenone, 2-hydroxy-2-methylpropiohenone, 2-hydroxy-2-methyl-4'-isopropylpropiophenone, isopropylbenzoin ether, isobutylbenzoin ether, 2,2-diethoxyacetophenone, 2,2-dimethoxy-2-phenylacetophenone, camphorquinone, benzanthrone, 2-methyl-1-[4-(methylthio)phenyl]-2-morpholino propane-1-one, 2-benzyl-2-dimethylamino-1-(4-morpholinophenyl)-butanone-1, ethyl 4-dimethylaminobenzoate, isoamyl 4-dimethylaminobenzoate, 4,4'-di(t-butylperoxycarbonyl)benzophenone, 3,4,4'-tori(t-butylperoxycarbonyl)benzophenone, 2,4,6-trimethylbenzoyldiphenylphosphine oxide, 2-(4'-methoxystyryl)-4,6-bis (trichloromethyl)-s-triazine, 2-(3',4'-dimethoxystyryl)-4,6-bis(trichloromethyl)-s-triazine, 2-(2',4'-dimethoxystyryl)-4,6-bis(trichloromethyl)-s-triazine, 2-(2'-methoxystyryl)-4,6-bis (trichloromethyl)-s-triazine, 2-(4'-pentyloxystyryl)-4,6-bis (trichloromethyl)-s-triazine, 4-[p-N,N-di(ethoxycarbonylmethyl)]-2,6-di(trichloromethyl)-s-triazine, 1,3-bis(trichloromethyl)-5-(2'-chlorophenyl)-s-triazine, 1,3-bis(trichloromethyl)-5-(4'-methoxypheny)-s-triazine, 2-(p-dimethylaminostyryl)benzoxazole, 2-(p-dimethylaminostyryl)benzthiazole, 2-mercaptobenzothiazole, 3,3'-carbonylbis(7-diethylaminocoumarin), 2-(o-chlorophenyl)-4,4',5,5'-tetraphenyl-1,2'-biimidazole, 2,2'-bis(2-chlorophenyl)-4,4',5,5'-tetrakis(4-carboethoxyphenyl)-1,2'-biimidazole, 2,2'-bis(2,4-dichlorophenyl)-4,4',5,5'-tetraphenyl-1,2'-biimidazole, 2,2'-bis(2,4-dibromophenyl)-4,4',5,5'-tetraphenyl-1,2'-biimidazole, 2,2'-bis(2,4,6-trichlorophenyl)-4,4',5,5'-tetraphenyl-1,2'-biimidazole, 3-(2-methyl-2-dimethylaminopropionyl)carbazole, 3,6-bis (2-methyl-2-morpholinopropionyl)-9-n-dodecylcarbazole, 1-hydroxycyclohexylphenylketone, bis(η5-2,4-cyclopentadiene-1-yl)-bis(2,6-difluoro-3-(1H-pyrrol-1-yl)-phenyl)titanium, 3,3',4,4'-tetra(t-butylperoxy carbonyl)benzophenone, 3,3',4,4'-tetra(t-hexylperoxycarbonyl)benzophenone, 3,3'-di(carbomethoxy)-4,4'-di(t-butylperoxycarbonyl)benzophenone, 3,4'-di(carbomethoxy)-4,3'-di(t-butylperoxycarbonyl) benzophenone, 4,4'-di(carbomethoxy)-3,3'-di(t-butylperoxycarbonyl)benzophenone, 2-hydroxyl-1-{4-[4-(2-hydroxy-2-methylpropionyl)-benzyl]phenyl}-2-methyl-propane-1-one and bis(2,4,6-trimethylbenzoyl)-phenylphosphine oxide. The compounds may be used alone, or effectively used by mixing two or more thereof.

A content of the radical polymerization initiator is preferably 0.01 part by weight to 20 parts by weight, and further preferably 1 part by weight to 10 parts by weight, based on a total amount (100 parts by weight) of a radical polymerization resin.

Solvent (e)

Components (a), (b), (c) and (d) contained in the coating agent according to the present application may be dissolved in a solvent such as an organic solvent, and used. The solvent is not particularly limited. A general solvent or the like may be used.

Specific examples of the solvent include a hydrocarbon-based solvent (such as benzene and toluene), an ether-based solvent (such as diethyl ether, tetrahydrofuran, diphenyl ether, anisole and dimethoxybenzene), a halogenated hydrocarbon-based solvent (such as methylene chloride, chloroform and chlorobenzene), a ketone-based solvent (such as acetone, methyl ethyl ketone and methyl isobutyl ketone), an alcohol-based solvent (such as methanol, ethanol, propanol, isopropanol, butyl alcohol and t-butyl alcohol), a nitrile-based solvent (such as acetonitrile and propionitrile, benzonitrile), an ester-based solvent (such as ethyl acetate, butyl acetate and 2-hydroxymethyl isobutyrate), a carbonate-based solvent (such as ethylene carbonate and propylene carbonate), an amide-based solvent (N,N-dimethylformamide and N,N-dimethylacetamide), a hydrochlorofluorocarbon-based solvent (HCFC-141b and HCFC-225), a hydrofluorocarbon (HFCs)-based solvent (HFCs having 2 to 4, or 5 and 6 or more carbons), a perfluorocarbon-based solvent (perfluoropentane and perfluorohexane), an alicyclic hydrofluorocarbon-based solvent (fluorocyclopentane and fluorocyclobutane), an oxygen-containing fluorine-based solvent (fluoroether, fluoropolyether, fluoroketone and fluoroalcohol), an aromatic-based fluorine solvent ($\alpha,\alpha,\alpha$-trifluorotoluene and hexafluorobenzene), and water. The solvents may be used alone, or in combination of two or more thereof. Specific examples thereof include a mixed solvent of methyl ethyl ketone and methyl isobutyl ketone. Workability on solution homogenization, upon preparing the coating agent, can be improved by adding the solvent such as methyl ethyl ketone according to which an improvement in solubility of the material in the resin can be expected in comparison with methyl isobutyl ketone. Moreover, the coating agent can be stabilized by the improvement in the solubility. As a mixing ratio (weight reference), for example, a range in which methyl isobutyl ketone/methyl ethyl ketone=1 to 99/99 to 1 can be applied, and the ratio is preferably in a range: 20 to 80/80 to 20.

A content of the solvent is 20 parts by weight to 500 parts by weight based on a total amount of resin compositions with which the curable film is formed. The content is preferably 50 parts by weight to 400 parts by weight based thereon.

Additive (f)

An additive may be added to the coating agent in addition to the materials described above. For example, in order to provide the surface layer with hardness and scratch resistance of the film, a filler may be added thereto. In order to improve coatability, a leveling agent may be added thereto. In addition thereto, an additive such as a weather-resistant agent and an antifoaming agent may be added thereto.

More specifically, within the range in which an effect of the cured film formed by the coating agent is not adversely affected, any component may be further incorporated into the coating agent, such as an active energy ray sensitizer, a polymerization inhibitor, a polymerization initiation aid, the leveling agent, a wettability improver, a surfactant, a plasticizer, an ultraviolet light absorber, a light stabilizer, an antioxidant, an antistatic agent, a silane coupling agent, an inorganic filler typified by silica and alumina, and an organic filler.

Specific examples of the leveling agent include, as a commercial item, an acrylic surface conditioner BYK-350, BYK-352, BYK-354, BYK-356, BYK-381, BYK-392, BYK-394, BYK-3441, BYK-3440 and BYK-3550 (trade names for all, made by BYK Japan K.K.).

Moreover, specific examples of a silicone-based surface conditioner include BYK-UV3500, BYK-UV-3570 (trade names for all, made by BYK Japan K.K.), TEGO Rad 2100, 2200N, 2250, 2500, 2600, 2700 (trade names for all, made by Evonik Japan Co., Ltd.), and X-22-2445, X-22-2455, X-22-2457, X-22-2458, X-22-2459, X-22-1602, X-22-1603, X-22-1615, X-22-1616, X-22-1618, X-22-1619, X-22-2404, X-22-2474, X-22-174DX, X-22-8201, X-22-2426, X-22-164A and X-22-164C (trade names for all, made by Shin-Etsu Chemical Co., Ltd.).

Specific examples of the weather-resistant agent include an ultraviolet light absorber of benzotriazols, hydroxyphenyltriazines, benzophenones, salicylates, cyanoacrylates, triazines or dibenzoylresorcinols.

Specific examples of the benzotriazols include TINUVIN PS, TINUVIN 99-2, TINUVIN 326, TINUVIN 384-2, TINUVIN 900, TINUVIN 928, TINUVIN 1130 and TINUVIN Carboprotect, made by BASF SE. Specific examples of the hydroxyphenyltriazines include TINUVIN 400, TINUVIN 405, TINUVIN 460, TINUVIN 477 and TINUVIN 479, made by BASF SE. Specific examples of the benzophenones include 1413, made by ADEKA Corporation, and Sumisorb 130, made by Sumika Chemtex Company, Limited. Specific examples of the salicylates include phenyl salicylate, p-tert-butylphenyl salicylate and p-octyl phenyl salicylate. Specific examples of the cyanoacrylates include 2-ethylhexyl2-cyano-3,3-diphenyl acrylate and ethyl 2-cyano-3,3-diphenyl acrylate. Specific examples of the triazines include LA-46 and LA-F70, made by ADEKA Corporation. Specific examples of the dibenzoylresorcinols include 4,6-dibenzoylresorcinol.

The ultraviolet light absorbers may be used alone, or in combination of two or more thereof. With regard to the ultraviolet light absorber, a kind or a combination thereof is preferably appropriately selected based on a wavelength of ultraviolet rays to be desirably absorbed.

Moreover, specific examples of the light stabilizer (HALS) include TINUVIN (registered trademark) 5100 (neutral type general-purpose HALS), TINUVIN 292 (compound name: bis(1,2,2,6,6-pentamethyl-4-piperidinyl)sebacate, methyl(1,2,2,6,6-pentamethyl-4-piperidinyl)sebacate), TINUVIN 152 (compound name: 2,4-bis[N-butyl-N-(1-cyclohexyloxy-2,2,6,6-tetramethylpiperidine-4-yl)amino]-6-(2-hydroxyethylamine)-1,3,5-triazine), TINUVIN 144 (compound name: bis(1,2,2,6,6-pentamethyl-4-piperidinyl)-[[3,5-bis(1,1-dimethylethyl)-4-hydroxyphenyl]methyl]butylmalonate), TINUVIN 123 (compound name: decanedioic acid, bis(2,2,6,6-tetramethyl-1-(octyloxy)-4-piperidinyl)ester, reaction products (in the presence of 1,1-dimethylethylhydroperoxide and octane)), TINUVIN 111FDL (about 50%, TINUVIN 622, compound name: butanedioate polymer (in the presence of 4-hydroxy-2,2,6,6-tetramethyl piperidinyl-yl)ethanol), about 50%, and CHIMASSORB 119, compound name:

N—N'—N''—N'''-tetrakis(4,6-bis(butyl-(N-methyl-2,2,6, 6-tetra methylpiperidine-4-yl)amino)triazine-2-yl)-4,7-diazadecane-1,10-diamine), for all, made by BASK SE. Alternatively, specific examples thereof include ADEKA STUB LA series, specifically, LA-52 ((5)-6116), LA-57 ((5)-5555), LA-62 ((5)-5711), LA-67 ((5)-5755), LA-82 ((5)-6023) and LA-87 ((5)-6022), for all, made by ADEKA Corporation. In addition, the number in parentheses represents an existing chemical substance number.

Specific examples of the inorganic filler include, as a commercial item, MEK-ST-40, MEK-ST-L, MEK-ST-ZL, PGM-AC-2140Y, PGM-AC-41301Y, AS-200, and AS-520, made by Nissan Chemical Industries LTD., Anatase $TiO_2$, $Al_2O_3$, ZnO, $ZrO_2$, and cobalt blue, made by CIK NanoTek Corporation, and zirconium oxide, barium titanate, titanium oxide, silica, alumina and an MUA filler, made by Mikuni Color Ltd.

Specific examples of the organic filler include Techpolymer MBX series, and SBX series, made by Sekisui Plastics Co., Ltd., Art Pearl crosslinked acrylic beads, and Art Pearl crosslinked urethane beads, made by Negami Chemical Industrial Co., Ltd., and Ganz Pearls made by Aica Kogyo Company, Limited.

The fillers may be used alone, or in combination of two or more thereof.

Other resin components may be added to the coating agent. Specific examples thereof include a thermoplastic resin and rubber.

Characteristics inherent to the resin (such as mechanical physical properties, surface or interface characteristics and compatibility) can be modified by adding the thermoplastic resin and the rubber as other resins.

Specific examples of the thermoplastic resin include the resins described below.

Polyethylene, polypropylene, polyvinyl chloride, polyvinylidene chloride, polystyrene, an acrylonitrile-styrene resin, an acrylonitrile-butadiene-styrene resin, a poly(meth)acrylate resin, ultra-high molecular weight polyethylene, poly-4-methylpentene, syndiotactic polystyrene, polyacetal, polycarbonate, polyphenylene oxide, polyphenylene sulfide, polysulfone, polyethersulfone, polyetheretherketone, polyarylate (such as U polymer; trade name, Unitika Ltd., and Vectra; trade name, Polyplastics Co., Ltd.), polyimide (Kapton; trade name, Toray Industries, Inc., AURUM; trade name, Mitsui Chemicals, Inc.), polyetherimide and polyamideimide.

Polyamide such as nylon 6, nylon 6,6, nylon 6,10, nylon MXD6, nylon 6,T (trade names for all, made by E. I. du Pont de Nemours and Company).

Polyester such as polyethylene terephthalate, polybutylene terephthalate and polyethylene 2,6-naphthalenedicarboxylate.

Further, a fluorocarbon resin such as polytetrafluoroethylene and polyvinylidene fluoride.

The curable resin used for surface layer 12 is used as the coating agent to be applied onto the base material film. Therefore, the coating agent is preferably in a liquid state. When the curable resin is in a solid state, as described above, the curable resin may be dissolved in the solvent and used as the coating agent.

A concentration of the curable resin in the coating agent can be selected in such a manner that viscosity of the coating agent has a level according to a coating method such as a wet coating process. The concentration is preferably 1 to 80% by weight, and further preferably 3 to 60% by weight. The concentration of the curable resin in the coating agent can be adjusted by using the solvent. As the solvent, for example, a general organic solvent such as methyl ethyl ketone and methyl isobutyl ketone can be used. In addition, when the solubility in the solvent is reduced by a length of the fluoroalkyl group of the fluorine compound contained in the curable composition, or the like, a fluorine-based organic solvent may be used. Moreover, other publicly known additives, for example, a leveling agent such as a surfactant may be added to the coating agent when necessary. If the leveling agent is added thereto, surface tension of the coating agent can be controlled to suppress a surface defect caused upon forming the layer, such as cissing and a crater.

Specific examples of curing treatment for curing the curable resin include curing treatment by ultraviolet irradiation, heating, electron beam irradiation or the like. In addition, when the coating film contains the solvent, ordinarily, the coating film is preferably heated in the range of 70° C. to 200° C. for several tens of minutes to remove the solvent remaining in the coating film, and then subjected to the curing treatment. As the curing by the ultraviolet irradiation, the coating liquid may be irradiated with ultraviolet rays having a wavelength of 200 to 400 nanometers from a UV lamp (for example, a high-pressure mercury lamp, an ultra-high-pressure mercury lamp, a metal halide lamp or a high power metal halide lamp) for a short period of time (within the range of several seconds to several tens of seconds). Moreover, as the curing by the electron beam irradiation, the coating liquid may be irradiated with a low-energy electron beam from a self-shielding low-energy-electron accelerator of 300 keV or less.

Fluorine-based compound (b) and fluorosilsesquioxane derivative (c) have the properties according to which fluorine-based compound (b) and fluorosilsesquioxane derivative (c) are easily accumulated in the interface between air and the solid (or liquid) under the hydrophobic atmosphere (for example, in air). The reason is conceivably that components (b) and (c) each containing the fluorine group have hydrophobicity higher than the hydrophobicity of the resin, and thus are drawn onto an air side. Accordingly, in a process of coating, components (b) and (c) are accumulated near the surface of surface layer 12, and concentrations of components (b) and (c) are biased on the surface side. As a result, as shown in FIGS. 1 and 2, an inclined structure of the concentrations of components (b) and (c) is formed near the surface of surface layer 12.

Moreover, components (b) and (c) have excellent characteristics as a stain-proof material, and therefore the stain-proof properties of the surface of surface layer 12 can be improved.

Laminates 100 and 200

Figure 2:
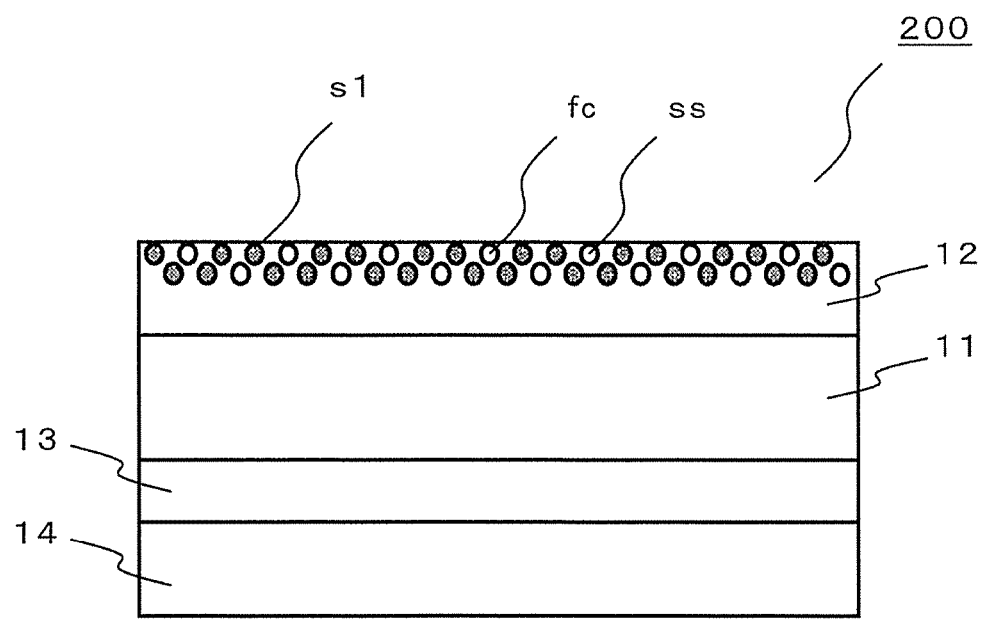
FIG. 2 is a diagram showing a layer structure of laminate 200 according to the second embodiment of the invention.

Laminates 100, 200 according to a second embodiment of the invention, as shown in FIGS. 1 and 2, have base material film 11 provided with surface layer 12, and adhesive layer 13. Laminates 100, 200 each have release film 14 during production, but are used by peeling off release film 14 upon being attached onto the surface of the article being the adherend.

Base Material Film 11

As base material film 11, a film formed of the thermoplastic resin is preferably used.

Specific examples of the thermoplastic resin include a polyurethane-based resin, a polyester-based resin, an acetate-based resin, a polyethersulfone-based resin, a polycarbonate-based resin, a polyamide-based resin, a polyimide-based resin, a polyolefin-based resin, a (meth)acrylic resin, a polyvinyl chloride-based resin, a polyvinylidene chloride-based resin, a polystyrene-based resin, a polyvinyl alcohol-based resin, a polyarylate-based resin, a polyphenylenesulfide-based resin and a norbornene-based resin. Specifically, thermoplastic polyurethane, polycaprolactone (PCL), an acrylic acid polymer, polyester, polyacrylonitrile, polyether ketone, polystyrene, polyvinyl acetate or a derivative thereof is preferred. The resins may be used alone, or in combination of two or more thereof.

Thermoplastic polyurethane is further preferred. Specific examples of the thermoplastic polyurethane include Argotec 49510, and Argotec 49510-DV, made by Argotec, LLC, Esmer URS PX86, Esmer URS PX93, and Esmer URS PX98, made by Nihon Matai Co., Ltd., DUS 202, DUS 213, DUS 235, DUS 501, DUS 601, DUS 605, DUS 614, DUS 203, DUS 220, DUS 701, XUS 2086, XUS 2098, DUS 451, and DUS 450, made by Sheedom Co., Ltd., Unigrand XN 2001, XN 2002 and XN 2004, made by Nihon Unipolymer Co., Ltd. Above all, polycaprolactone-based thermoplastic polyurethane using polycaprolactone polyol as a polyhydroxy compound, polycarbonate-based thermoplastic polyurethane using polycarbonate polyol or polyether-based thermoplastic polyurethane using polyether polyol is preferred.

A thickness of base material film 11 is not particularly limited, but when the present application invention is applied as the laminate, the thickness of the base material film is preferably 25 to 300 micrometers, and further preferably 100 to 200 micrometers. If the thickness of the base material film is 25 micrometers or more, mechanical strength of the base material is sufficient, and the layer can be formed on the base material. Moreover, if the thickness is 300 micrometers or less, a thickness of the laminate is not excessively increased.

Surface Layer 12

Surface layer 12 is prepared first by applying the coating agent containing the curable composition onto the surface of base material film 11. Surface layer 12 is formed by drying and curing the resulting material. In surface layer 12, component (b) and/or component (c) is accumulated in the interface with air and thus configured. In addition, a term "curable composition" means a crosslinking component (effective component) in the coating agent, referring to components (a), (b), (c) and (d).

A thickness of surface layer 12 is typically 1 to 100 micrometers, preferably 10 to 50 micrometers, and further preferably 10 to 30 micrometers. If the thickness of surface layer 12 is 1 micrometer or more, the mechanical strength is sufficient, and if the thickness is 100 micrometers or less, the thickness of the laminate is not excessively increased. In addition, when the thermoplastic polyurethane is used in the base material film, the thickness of surface layer 12 is further reduced owing to the flexibility of the thermoplastic polyurethane. The thickness is preferably 1 to 50 micrometers, and further preferably 3 to 30 micrometers.

In coating of the coating agent containing the curable composition, a wet coating method for uniformly coating the curable composition onto the base material is preferably applied. As the wet coating method, a gravure coating process, a die coating process or the like can be applied.

The gravure coating process applies a system according to which a gravure roll produced by applying uneven embossing onto a surface is dipped into a coating liquid, scraping off the coating agent attached onto an uneven portion of the surface of the gravure roll by a doctor blade to accumulate the liquid in a recess portion, thereby accurately metering the liquid, and transferring the liquid onto the base material. The liquid having low viscosity can be coated at a low thickness by the gravure coating process.

The die coating process applies a system according to which the liquid is coated on the base material while pressurizing and extruding the liquid from an applying head called a die. Coating with high accuracy can be achieved by the die coating process. Further, the liquid is not exposed to open air during coating, and therefore a change in the concentration of the coating agent by drying, or the like is hard to occur.

Specific examples of other wet coating process include a spin coating process, a bar coating process, a reverse coating process, a roll coating process, a slit coating process, a dipping process, a spray coating process, a kiss coating process, a reverse kiss coating process, an air knife coating process, a curtain coating process and a rod coating process. The coating method can be appropriately selected from the methods described above according to the thickness required therefor. Further, coating can be made at a line speed of several tens of meters per minute (for example, about 20 m/min), and therefore the product can be produced in mass to improve production efficiency by applying the wet coating process.

Adhesive Layer 13/Release Film 14

As shown in FIGS. 1 and 2, adhesive layer 13 is formed by applying an adhesive onto a side of a reverse surface of base material film 11 subjected to stain-proof treatment (or to be subjected to the stain-proof treatment) by surface layer 12. Adhesive layer 13 may be formed directly on the surface of base material film 11, or may be laminated through any other layer between base material film 11 and adhesive layer 13.

As the adhesive used for adhesive layer 13, an acrylic adhesive, a rubber-based adhesive, a urethane-based adhesive, a silicone-based adhesive or the like can be used. In an application requiring long-term durability from an aspect of a product design, the acrylic adhesive having excellent heat resistance and weather resistance is preferred.

Specific examples of the acrylic adhesive include an acrylic adhesive containing an acrylic copolymer prepared by copolymerizing a monomer component mainly containing acrylate with a monomer component having a functional group such as a carboxyl group and a hydroxyl group.

Specific examples of the acrylate include methyl (meth)acrylate, ethyl (meth)acrylate, n-propyl (meth)acrylate, isopropyl (meth)acrylate, n-butyl (meth)acrylate, isobutyl (meth)acrylate, sec-butyl (meth)acrylate, t-butyl (meth) acrylate, pentyl (meth)acrylate, isopentyl (meth)acrylate, hexyl (meth)acrylate, cyclohexyl (meth)acrylate, heptyl (meth)acrylate, n-octyl (meth)acrylate, isooctyl (meth)acrylate, 2-ethylhexyl (meth)acrylate, nonyl (meth)acrylate, isononyl (meth)acrylate, decyl (meth)acrylate, isodecyl (meth)acrylate, undecyl (meth)acrylate, dodecyl (meth) acrylate, tridecyl (meth)acrylate, tetradecyl (meth)acrylate, pentadecyl (meth)acrylate, hexadecyl (meth)acrylate, heptadecyl (meth)acrylate, octadecyl (meth)acrylate, nonadecyl (meth)acrylate, eicosyl (meth)acrylate, isobornyl (meth)acrylate and 1-adamanthyl (meth)acrylate. One kind or two or more kinds of the alkyl (meth)acrylate can be used.

The alkyl (meth)acrylate described above can be copolymerized with a monomer component described below. Specific examples of a copolymerizable monomer component include a carboxyl group-containing monomer, such as itaconic acid, maleic acid, crotonic acid, isocrotonic acid, fumaric acid, (meth)acrylic acid, carboxyethyl (meth)acrylate, carboxypentyl (meth)acrylate; a hydroxyl group-containing monomer, such as 2-hydroxyethyl (meth)acrylate, 3-hydroxypropyl (meth)acrylate, 4-hydroxybutyl (meth)acrylate, 6-hydroxyhexyl (meth)acrylate, 8-hydroxyoctyl (meth)acrylate, 10-hydroxydecyl (meth)acrylate, 12-hydroxylauryl (meth)acrylate, (4-hydroxymethylcyclohexyl)-methyl acrylate; a glycidyl group-containing monomer, such as glycidyl (meth)acrylate, and methylglycidyl (meth)acrylate; a cyanoacrylate-based monomer, such as acrylonitrile and methacrylonitrile; a monomer containing nitrogen, such as N,N-dimethylaminoethyl (meth)acrylate, N,N-dimethylaminopropyl (meth)acrylamide, N,N-dimethyl (meth)acrylamide, N,N-diethyl (meth)acrylamide, N-isopropyl (meth)acrylamide, N-hydroxyethyl (meth)acrylamide, (meth)acryloylmorpholine, N-vinyl-2-piperidone, N-vinyl-3-morpholinone, N-vinyl-2-caprolactam, N-vinyl-2-pyrrolidone, N-vinyl-1,3-oxazine-2-one, N-vinyl-3,5-morpholinedione, N-cyclohexylmaleimide, N-phenylmaleimide, N-acryloylpyrrolidine and t-butylaminoethyl (meth)acrylate; and a monomer such as styrene or a styrene derivative and vinyl acetate. One kind or two or more kinds of the monomers can be copolymerized with (meth)acrylate and used when necessary.

The adhesive used in the invention preferably contains a carboxyl group-containing monomer of at least one kind selected from a group consisting of butyl acrylate and 2-ethylhexyl (meth)acrylate, and at least one kind selected from a group consisting of acrylic acid and methacrylic acid, for example.

In the adhesive used in the invention, a glass transition temperature (Tg) is increased, for improving the heat resistance and the weather resistance, by adding a hard component such as methyl acrylate and vinyl acetate thereto, for example. Specific examples of such a hard component used for adjusting the glass transition temperature include methyl acrylate, vinyl acetate, methyl methacrylate and acrylonitrile.

In addition, the ultraviolet light absorber, the light stabilizer and the like may be added thereto when necessary for further improving various characteristics such as the weather resistance.

A proportion of the hard component is 10 to 80% by weight, preferably 20 to 70% by weight and further preferably 30 to 60% by weight, based on a total amount of the adhesive.

Weight average molecular weight (Mw) of the acrylic copolymer is 50,000 to 2,000,000, preferably 100,000 to 1,500,000 and further preferably 150,000 to 1,000,000.

Number average molecular weight (Mn) thereof is 10,000 to 500,000, preferably 10,000 to 400,000 and further preferably 10,000 to 300,000.

A variance value thereof is 1 to 20, preferably 1 to 15 and further preferably 2 to 10.

The glass transition temperature is −70° C. to 0° C., preferably −40° C. to 0° C., further preferably −30° C. to 0° C. and particularly preferably −20° C. to 0° C.

In order to apply, onto release film 14 or base material film 11, the composition to be formed into adhesive layer 13, the application can be performed by a gravure coating process, a bar coating process, a spray coating process, a spin coating process, a roll coating process, a die coating process, a knife coating process, an air knife coating process, a hot-melt coating process, a curtain coating process or the like, which is ordinarily applied thereto.

A thickness of adhesive layer 13 is 10 to 100 micrometers, preferably 15 to 50 micrometers and further preferably 25 to 45 micrometers from an aspect of adhesion after attachment.

As release film 14, a plastic film of a polyester-based resin, a polyolefin-based resin or the like, cellophane or paper subjected to filling treatment, such as glassine paper, can be used, for example. Further, such a resin film can be used as the resin film of a fluorocarbon resin, a silicone-based resin, and polyethylene terephthalate, polyethylene and polypropylene prepared by coating, on one surface or both surfaces, a release agent such as long chain alkyl group-containing carbamate.

A thickness of the release film is somewhat different depending on a material used, but is ordinarily 10 to 250 micrometers and preferably 20 to 200 micrometers.

The laminate according to the present application has excellent self-restoring properties and high water repellency and stain-proof properties, and also stretchability and slipperiness by the surface layer. Moreover, the surface can be smoothened, reflectivity can be suppressed, and gloss feeling can be provided by the surface layer. Moreover, an adhesive surface of the adhesive layer is protected by the release film having high releasability until the surface is attached onto the adherend, and therefore the laminate can be distributed and conveyed without deteriorating stickiness.

Surface-Protected Article

The surface-protected article according to a third embodiment of the invention will be described. Specific examples of the article being the adherend to be attached with the laminate according to the application include an automobile, an aircraft and a ship. The article is effective to protection of a coated surface of various body portions of the articles, particularly a portion (such as a tip of a front side hood and other tip surfaces and a rocker panel) exposed to a risk of flying pieces (such as sand and stone), insects or the like.

Further, the surface-protected article can be used for a window, a building material, a digital signage, packaging and an office article, and can be used in a wide range of fields such as electronics, security and industry, for example. Further, the article is also applicable to packing of wastes, protection of a front surface of medical equipment or the like in a nursing care and medical field. In addition thereto, the article can smooth the protected surface thereof to improve designabilty.

EXAMPLES

Test 1

Production Example 1: Synthesis of Urethane (Meth)Acrylate Resin (a)

Then, 306 g (1.2 mol) of 4,4'-dicyclohexylmethanediisocyanate (trade name; Desmodur (registered trademark); made by Sumika Bayer Urethane Co., Ltd.), 1000 g (1 mol) of polycarbonatediol using 1,4-cyclohexanedimethanol (trade name; ETERNACOLL (registered trademark) UC-100; made by Ube Industries, Ltd.), and 1700 g of 2-butanone (MEK; methyl ethyl ketone) were charged, and the resulting mixture was allowed to react under conditions of 70° C. to 80° C. up to a predetermined remaining isocyanate concentration. Then, 255 g (2.2 mol) of 2-hydroxyethyl acrylate (trade name; BHEA; made by Nippon Shokubai Co., Ltd.), and 0.85 g of hydroquinone monomethyl ether (trade name; MQ; made by Kawaguchi Chemical Industry Co., Ltd.) as a polymerization inhibitor were put to the reaction solution, and then the resulting mixture was allowed to react under conditions of 70° C. to 80° C. until a predetermined remaining isocyanate concentration reached 0.1% by weight to obtain polycarbonate-based urethane acrylate resin (a). Further, 642 g of MEK was added thereto, and the resulting mixture was adjusted to 40% by weight in a solid concentration. Weight average molecular weight of the obtained polymer as determined by GPC analysis was 100,000.

Production Example 2: Synthesis of Fluorine-Based Compound (b) Having a Polymerizable Functional Group Under a nitrogen atmosphere, as perfluoropolyether, 50 g of Fomblin Zdol-4000 (average molecule weight: 4000) having hydroxy groups in both terminals, made by Solvay Solexis, Inc., was dissolved into hexafluoro-m-xylene (70 g) at room temperature, and 3.5 g of acryloyloxyethyl isocyanate (trade name; Karenz AOI; made by Showa Denko K.K.) was added thereto, and the resulting mixture was heated to 45° C. under the nitrogen atmosphere. Then, a solution prepared by dissolving 0.076 g of dibutyltin dilaurate (made by Tokyo Chemical Industry Co., Ltd.) into 0.55 g of methyl ethyl ketone (made by Wako Pure Chemical Industries, Ltd.) was added dropwise thereto, and the resulting mixture was stirred at 45° C. to 50° C. for 2 hours. Further, a solution prepared by dissolving 0.043 g of dibutyltin dilaurate (made by Tokyo Chemical Industry Co., Ltd.) into 0.55 g of methyl ethyl ketone (made by Wako Pure Chemical Industries, Ltd.) was added thereto, and the resulting mixture was stirred at the same temperature for 2 hours. Then, the reaction solution was ice-cooled, and methanol (2.0 g) was added dropwise thereto. The resulting mixture was stirred at the same temperature for 30 minutes, and the resulting mixture was diluted with methyl ethyl ketone (7.4 g) to obtain a solution of perfluoropolyether compound (b) having polymerizable functional groups in both terminals (134 g; solid content 40 wt %).

Production Example 3: Synthesis of Fluorosilsesquioxane Derivative (c); Synthesis of Polymer A-1

In a four-neck round bottom flask attached with a reflux condenser and a dropping funnel and sealed with nitrogen, compound A (25 g) described below, Silaplane FM 0721 (6.3 g; made by JNC CORPORATION), 2-hydroxyethyl methacrylate (18.8 g), methyl methacrylate (12.5 g) and methyl ethyl ketone (62 g) were put, and the resulting mixture was refluxed and degassed for 15 minutes using an oil bath, and then a solution prepared by dissolving azobisisobutyronitrile (0.48 g) and mercaptoacetic acid (0.054 g) into methyl ethyl ketone (4.8 g) was charged thereinto to start polymerization. After 3 hours from the polymerization start, a solution obtained by dissolving azobisisobutyronitrile (0.48 g) into methyl ethyl ketone (4.3 g) was added thereto, and the resulting mixture was aged for 5 hours to obtain a solution of a copolymer. Further, as a polymerization inhibitor, para-methoxyphenol (0.16 g) and dibutyltin dilaurate (0.15 g; made by Showa Denko K.K.) were dissolved into methyl ethyl ketone (1.5 g), and the resulting solution was added thereto, and then Karenz AOI (26.4 g) was added dropwise onto the resulting mixture using a dropping funnel so that a liquid temperature was 35° C. to 50° C., and then the resulting mixture was aged at 45° C. for 3 hours after the dropping.

Then, methanol (9 g) was added to the resulting mixture for treatment, and paramethoxyphenol (0.16 g) was added to the resulting mixture, and the resulting mixture was diluted with methyl isobutyl ketone (107.3 g) to obtain a 30 w % solution of objective polymer (A-1).

Polymer (A-1) obtained had weight average molecular weight Mw: 42,000 and polydispersity index: Mw/Mn 1.9. The weight average molecular weight and the polydispersity index were measured using gel permeation chromatography (GPC; model number: Alliance 2695; made by Waters Corporation; column: Shodex GPC KF-804L×2 (series); guard column: KF-G).

Compound A has a molecular structure represented by formula (5).

Formula 6

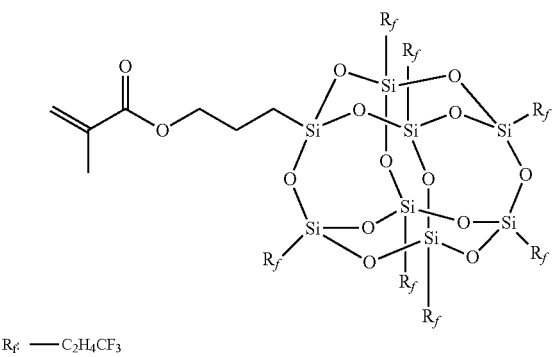

(5)

$R_f$ —— $C_2H_4CF_3$

Production Example 4: Preparation of Coating Agent A

In a 0.3 L scale-stainless steel bottle, 30 g of Shiko UV 1700B (solid component: 100% by weight; molecular weight 2,000; made by The Nippon Synthetic Chemical Industry Co., Ltd.), 68.5 g of methyl isobutyl ketone and 1.5 g of photopolymerization initiator (d) (trade name; IRGACURE 184; made by BASF SE) were put, and the resulting mixture was stirred for 1 hour by a stirring blade to obtain coating agent A having a solid component (effective component (a')) of 30% by weight. Coating agent A contains a urethane acrylate monomer.

Production Example 5: Preparation of Coating Agent B

In a 0.3 L scale-stainless steel bottle, 75 g of urethane (meth)acrylate-based resin (a), 23.5 g of methyl isobutyl ketone and 1.5 g of photopolymerization initiator (d) (trade name; IRGACURE 184; made by BASF SE) were put, and the resulting mixture was stirred for 1 hour by a stirring blade to obtain coating agent B having a solid component (effective component (a)) of 30% by weight. Coating agent B contains component (a).

Production Example 6: Preparation of Coating Agent C

In a 0.3 L scale-stainless steel bottle, 71.3 g of urethane (meth)acrylate-based resin (a), 3.8 g of fluorine-based compound (b), 23.6 g of methyl isobutyl ketone and 1.5 g of photopolymerization initiator (d) (trade name; IRGACURE 184; made by BASF SE) were put, and the resulting mixture was stirred for 1 hour by a stirring blade to obtain coating agent C having a solid component (effective components (a) and (b)) of 30% by weight. Coating agent C contains components (a) and (b).

Production Example 7: Preparation of Coating Agent D

In a 0.3 L scale-stainless steel bottle, 74.3 g of urethane (meth)acrylate-based resin (a), 1 g of fluorosilsesquioxane derivative (c), 23.3 g of methyl isobutyl ketone and 1.5 g of photopolymerization initiator (d) (trade name; IRGACURE 184; made by BASF SE) were put, and the resulting mixture was stirred for 1 hour by a stirring blade to obtain coating agent D having a solid component (effective components (a) and (c)) of 30% by weight. Coating agent D contains components (a) and (c).

Production Example 8: Preparation of Coating Agent E

In a 0.3 L scale-stainless steel bottle, 70.5 g urethane (meth)acrylate-based resin (a), 3.8 g of fluorine-based compound (b), 1 g of fluorosilsesquioxane derivative (c), 23.3 g of methyl isobutyl ketone and 1.5 g of photopolymerization initiator (d) (trade name; IRGACURE 184; made by BASF SE) were put, and the resulting mixture was stirred for 1 hour by a stirring blade to obtain coating agent E having a solid component (effective components (a), (b) and (c)) of 30% by weight. Coating agent E contains components (a), (b) and (c).

Production Example 9: Preparation of Adhesive A

To acrylic adhesive A being a copolymer containing 40 to 55 parts by weight of butyl acrylate, 40 to 55 parts by weight of methyl acrylate, 1 to 15 parts by weight of vinyl acetate and 0.1 to 3 parts by weight of carboxyl group-containing acrylic oxide, 30 parts by weight of ethyl acetate was added, and the resulting mixture was stirred at 23° C. for 30 minutes by a stirring blade to be adjusted to a solid component of 23%; by weight and viscosity of 1000 CPS. Adhesive A has weight average molecular weight (Mw) of 550,000 and a glass transition temperature of −16° C.

Example 1: Preparation of Laminate 1

Adhesive A prepared by die coating was applied onto a thermoplastic polyurethane film being the thermoplastic polyurethane film (trade name; Argotec 49510; made by Argotec, LLC; thickness: 6 mil=152.4 μm) prepared by laminating, on one surface, a 50 μm polyethylene terephthalate protection film, and the resulting material was dried under conditions of 70° C.×3 minutes to form a 30 μm adhesive layer. Further, a 75 μm-thick polyethylene terephthalate film (release film A; surface roughness: 716 nm) subjected to release treatment with a silicone resin was pressure-bonded onto an adhesive layer surface by using a rubber roller, and the resulting material was cured for 1 day in a 45° C. environment. Then, the 50 μm polyethylene terephthalate protection film was peeled off, and coating agent C was applied, by using a coating rod No. 8 (made by R.D.S., Webster, N.Y.), onto a surface from which the film was peeled off, and the resulting material was dried under conditions of 90° C.×3 minutes. Then, the resulting material was photo-cured (integrated quantity of light: 850 mJ/cm$^2$) by using a conveyer-type ultraviolet irradiation device equipped with an H-Bulb made by Fusion Total Ultraviolet Systems, Inc. to obtain laminate 1 having a surface layer having a coating thickness of 5 μm.

Example 2: Preparation of Laminate 2

Laminate 2 was obtained in a manner similar to the procedures of laminate 1 except that coating agent E was used in place of coating agent C.

Comparative Example 1: Preparation of Laminate 3

Adhesive A prepared by die coating was applied onto a thermoplastic polyurethane film being the thermoplastic polyurethane film (trade name; Argotec 49510; made by Argotec, LLC; thickness: 6 mil=152.4 µm) prepared by laminating, on one surface, 50 µm-thick polyethylene terephthalate protection film, and the resulting material was dried under conditions of 70° C.×3 minutes to form an adhesive layer having a thickness of 30 µm. Further, 70 µm-thick polyethylene terephthalate film (release film A; surface roughness: 716 nm) subjected to release treatment with a silicone resin was pressure-bonded onto an adhesive layer surface by using a rubber roller, and the resulting material was cured for 1 day in a 45° C. environment to obtain laminate 3.

Comparative Example 2: Preparation of Laminate 4

Laminate 4 was obtained in a manner similar to the procedures of laminate 1 except that coating agent A was used in place of coating agent C.

Comparative Example 3: Preparation of Laminate 5

Laminate 5 was obtained in a manner similar to the procedures of laminate 1 except that coating agent B was used in place of coating agent C.

Comparative Example 4: Preparation of Laminate 6

Laminate 6 was obtained in a manner similar to the procedures of laminate 1 except that coating agent D was used in place of coating agent C.

Testing Method (1) Self-Restoring Properties: Brass Brush Scratch Restoration Test A release film of a laminate cut into a size of a width of 40 mm and a length of 130 mm was peeled off, and an aqueous solution prepared by mixing 2 to 3 drops of baby shampoo (baby whole body shampoo; made by Johnson & Johnson Consumer Inc.) to 1 L of water was sprayed, by a sprayer, onto a surface on an adhesive layer side, and onto a coated plate (width: 50 mm, length: 150 mm, thickness: 1.2 mm) coated with a black coating material for an automobile, and the adhesive layer surface of the laminate was pasted onto the coated plate while air foam and water bubbles were pushed out by a rubber squeegee. Then, the resulting laminate was allowed to stand at room temperature until the air bubbles and the water bubbles remaining in the adhesive layer surface and the coated plate were visually unobserved to obtain a sample. In a self-restoration test, a surface of a test specimen was scratched by using a four row brass brush (AS ONE) with a load of 1000 kgf, a speed of 3000 mm/min, a distance of 100 mm in one way and 10 round trips (a surface property tester HEIDON Type: 14W; made by SHINTO Scientific Co. Ltd.), and then the brass brush was immediately removed, and observation was made on the test specimen for a period of time until a scratch on the surface disappeared.

Good: The scratch disappeared within 1 minute.

Poor: The scratch did not disappear even over 1 minute.

(2) Water Repellency: Contact Angle Measurement

A contact angle of water on the surface layer of the laminate was measured by using, as a probe liquid, distilled water (for nitrogen and phosphorus measurement; made by Kanto Chemical Co., Inc.) and using a contact-angle meter (Drop Master 400; made by Kyowa Interface Science Co., Ltd.).

(3) Stain-Proof Properties (Oil Repellency): Magic Ink Wiping-Off Test

Drawing was made on the surface layer of the laminate by using a black oily marker (made by Sharpie, Inc.), and repellency of oily ink and wiping-off properties by Dusper K-3 (made by OZU Corporation) were evaluated.

Good: The ink was repelled and wiped off completely.

Poor: The ink was unable to be wiped off.

(4) Stretchability: Elongation at Break in a Tensile Test

The release film of the laminate cut into a size of a width of 35 mm and a length of 200 mm was peeled off, and the resulting, laminate was placed between upper and lower crossheads of a tensile tester (Strograph VG; made by Toyo Seiki Seisaku-sho, Ltd.) in such a manner that an inter-chuck distance was 100 mm, and was moved upward at a crosshead speed of 127 mm/min, and a moving distance at which a crack is generated on the surface was visually observed, and elongation at break was calculated according to the following formula:

$$\text{Elongation at break (\%)} = \{\text{crosshead moving distance (mm)/inter-chuck distance (mm)}\} \times 100$$

(5) Slipperiness: Squeegee Sliding Test

A release film of a laminate cut into a size of a width of 40 mm and a length of 130 mm was peeled off, and an aqueous solution prepared by mixing 2 to 3 drops of baby shampoo (baby whole body shampoo; made by Johnson & Johnson Consumer Inc.) to 1 L of water was sprayed, by a sprayer, onto a surface on an adhesive layer side, and onto a coated plate (width: 50 mm, length: 150 mm, thickness: 1.2 mm) coated with a black coating material for an automobile, and the adhesive layer surface of the laminate was pasted onto the coated plate while air bubbles and water bubbles were pushed out by a rubber squeegee.

Good: The laminate was smoothly pasted thereon.

Poor: The laminate was caught.

TABLE 1

| | | Example 1 | Example 2 | Comparative Example 1 | Comparative Example 2 | Comparative Example 3 | Comparative Example 4 |
|---|---|---|---|---|---|---|---|
| Laminate | | Laminate 1 | Laminate 2 | Laminate 3 | Laminate 4 | Laminate 5 | Laminate 6 |
| Layer structure | Base material | Agrotec 49510 | Agrotec 49510 | Agrotec 49510 | Agrotec 49510 | Agrotec 49510 | Agrotec 49510 |
| | Coating agent (Component) | Coating agent C (a) + (b) | Coating agent E (a) + (b) + (c) | No agent (Only base material) | Coating agent A (Monomer) | Coating agent B (a) | Coating agent D (a) + (c) |
| | Adhesive | Adhesive A | Adhesive A | Adhesive A | Adhesive A | Adhesive A | Adhesive A |
| | Release film | Release film A | Release film A | Release film A | Release film A | Release film A | Release film A |
| Characteristics evaluation | Brass brush scratch restoration properties | Good | Good | Good | Poor | Good | Good |

TABLE 1-continued

|  | Example 1 | Example 2 | Comparative Example 1 | Comparative Example 2 | Comparative Example 3 | Comparative Example 4 |
|---|---|---|---|---|---|---|
| Water contact angle (°) | 107 | 108 | <100 | <100 | <100 | 102 |
| Magic ink test | Good | Good | Poor | Poor | Poor | Poor |
| Elongation at break (%) | 80 | 80 | — | 5 | 80 | 80 |
| Squeegee sliding test | Poor | Good | Poor | Poor | Poor | Good |

Compatibility of performance of the self-restoring properties, the water repellency (stain-proof properties) and the stretchability is provided by formulations in Examples 1 and 2. Moreover, the slipperiness of the surface is further improved in Example 2.

Test 2

Production Example 10: Preparation of Coating Agent F

In a 0.3 L scale-stainless steel bottle, 74.2 g of urethane (meth)acrylate-based resin (a), 0.1 g of fluorine-based compound (b), 23.3 g of methyl isobutyl ketone and 1.5 g of photopolymerization initiator (d) (trade name; IRGACURE 184; made by BASF SE) were put, and the resulting mixture was stirred for 1 hour by a stirring blade to obtain coating agent F having a solid component (effective components (a) and (b)) of 30% by weight. Coating agent F contains components (a) and (b).

Production Example 11: Preparation of Coating Agent G

In a 0.3 L scale-stainless steel bottle, 73.5 g of urethane (meth)acrylate-based resin (a), 0.8 g of fluorine-based compound (b), 23.3 g of methyl isobutyl ketone and 1.5 g of photopolymerization initiator (d) (trade name; IRGACURE 184; made by BASF SE) were put, and the resulting mixture was stirred for 1 hour by a stirring blade to obtain coating agent G having a solid component (effective components (a) and (b)) of 30% by weight. Coating agent G contains components (a) and (b).

Production Example 12: Preparation of Coating Agent H

In a 0.3 L scale-stainless steel bottle, 69.0 g of urethane (meth)acrylate-based resin (a), 5.3 g of fluorine-based compound (b), 23.4 g of methyl isobutyl ketone and 1.5 g of photopolymerization initiator (d) (trade name; IRGACURE 184; made by BASF SE) were put, and the resulting mixture was stirred for 1 hour by a stirring blade to obtain coating agent H having solid components (effective components (a) and (b)) of 30% by weight. Coating agent H contains components (a) and (b).

Production Example 13: Preparation of Coating Agent I

In a 0.3 L scale-stainless steel bottle, 66.8 g of urethane (meth)acrylate-based resin (a), 7.5 g of fluorine-based compound (b), 23.4 g of methyl isobutyl ketone and 1.5 g of photopolymerization initiator (d) (trade name; IRGACURE 184; made by BASF SE) were put, and the resulting mixture was stirred for 1 hour by a stirring blade to obtain coating agent I having a solid component (effective components (a) and (b)) of 30% by weight. Coating agent I contains components (a) and (b).

Example 3: Preparation of Laminate 7

Laminate 7 was obtained in a manner similar to the procedures of laminate 1 except that coating agent F was used in place of coating agent C.

Example 4: Preparation of Laminate 8

Laminate 8 was obtained in a manner similar to the procedures of laminate 1 except that coating agent G was used in place of coating agent C.

Example 5: Preparation of Laminate 9

Laminate 9 was obtained in a manner similar to the procedures of laminate 1 except that coating agent H was used in place of coating agent C.

Example 6: Preparation of Laminate 10

Laminate 10 was obtained in a manner similar to the procedures of laminate 1 except that coating agent I was used in place of coating agent C.

Testing Method

A testing method is to be applied in a manner similar to the method in test 1.

TABLE 2

|  |  |  | Example 1 | Example 3 | Example 4 | Example 5 | Example 6 |
|---|---|---|---|---|---|---|---|
| Laminate Layer structure |  |  | Laminate 1 | Laminate 7 | Laminate 8 | Laminate 9 | Laminate 10 |
|  | Base material |  | Agrotec 49510 | Agrotec 49510 | Agrotec 49510 | Agrotec 49510 | Agrotec 49510 |
|  | Coating agent |  | Coating agent C | Coating agent F | Coating agent G | Coating agent H | Coating agent I |
|  | (a):(b) |  | 95:5 | 99.9:0.1 | 99:1 | 93:7 | 90:10 |

TABLE 2-continued

|  |  | Example 1 | Example 3 | Example 4 | Example 5 | Example 6 |
|---|---|---|---|---|---|---|
| Characteristics evaluation | Adhesive Release film | Adhesive A Release film A | Adhesive A Release film A | Adhesive A Release film A | Adhesive A Release film A | Adhesive A Release film A |
|  | Brass brush scratch restoration properties | Good | Good | Good | Good | Poor |
|  | Water contact angle (°) | 107 | <100 | 105 | 107 | 107 |
|  | Magic ink test | Good | Poor | Good | Good | Good |
|  | Elongation at break (%) | 80 | 80 | 80 | 80 | 50 |
|  | Squeegee sliding test | Poor | Poor | Poor | Poor | Poor |

In a weight ratio ((a):(b)) of components (a) to (b), when a proportion of component (b) is 1 to 7 parts by weight, the performance is exhibited.

Test 3

Production Example 14: Preparation of Coating Agent J

In a 0.3 L scale-stainless steel bottle, 71.2 g of urethane (meth)acrylate-based resin (a), 3.8 g of fluorine-based compound (b), 0.01 g of fluorosilsesquioxane derivative (c), 23.6 g of methyl isobutyl ketone and 1.5 g of photopolymerization initiator (d) (trade name; IRGACURE 184; made by BASF SE) were put, and the resulting mixture was stirred for 1 hour by a stirring blade to obtain coating agent J having a solid component (effective components (a), (b) and (c)) of 30% by weight. Coating agent J contains components (a), (b) and (c).

Production Example 15: Preparation of Coating Agent K

In a 0.3 L scale-stainless steel bottle, 71.2 g of urethane (meth)acrylate-based resin (a), 3.8 g of fluorine-based compound (b), 0.1 g of fluorosilsesquioxane derivative (c), 23.6 g of methyl isobutyl ketone and 1.5 g of photopolymerization initiator (d) (trade name; IRGACURE 184; made by BASF SE) were put, and the resulting mixture was stirred for 1 hour by a stirring blade to obtain coating agent K having a solid component (effective components (a), (b) and (c)) of 30% by weight. Coating agent K contains components (a), (b) and (c).

Production Example 16: Preparation of Coating Agent L

In a 0.3 L scale-stainless steel bottle, 69.0 g of urethane (meth)acrylate-based resin (a), 3.8 g of fluorine-based compound (b), 3 g of fluorosilsesquioxane derivative (c), 22.9 g of methyl isobutyl ketone and 1.5 g of photopolymerization initiator (d) (trade name; IRGACURE 184; made by BASF SE) were put, and the resulting mixture was stirred for 1 hour by a stirring blade to obtain coating agent L having a solid component (effective components (a), (b) and (c)) of 30% by weight. Coating agent L contains components (a), (b) and (c).

Production Example 17: Preparation of Coating Agent M

In a 0.3 L scale-stainless steel bottle, 67.5 g of urethane (meth)acrylate-based resin (a), 3.8 g of fluorine-based compound (b), 5 g of fluorosilsesquioxane derivative (c), 22.4 g of methyl isobutyl ketone and 1.5 g of photopolymerization initiator (d) (trade name; IRGACURE 184; made by BASF SE) were put, and the resulting mixture was stirred for 1 hour by a stirring blade to obtain coating agent M having a solid component (effective components (a), (b) and (c)) of 30% by weight. Coating agent M contains components (a), (b) and (c).

Example 7: Preparation of Laminate 11

Laminate 11 was obtained in a manner similar the procedures of laminate 2 except that coating agent J was used in place of coating agent E.

Example 8: Preparation of Laminate 12

Laminate 12 was obtained in a manner similar the procedures of laminate 2 except that coating agent K was used in place of coating agent E.

Example 9: Preparation of Laminate 13

Laminate 13 was obtained in a manner similar the procedures of laminate 2 except that coating agent L was used in place of coating agent E.

Example 10: Preparation of Laminate 14

Laminate 14 was obtained in a manner similar the procedures of laminate 2 except that coating agent M was used in place of coating agent E.

Testing Method

A testing method is to be applied in a manner similar to the method in test 1.

TABLE 3

|  |  | Example 2 | Example 7 | Example 8 | Example 9 | Example 10 |
|---|---|---|---|---|---|---|
| Laminate Layer structure | | Laminate 2 | Laminate 11 | Laminate 12 | Laminate 13 | Laminate 14 |
| | Base material | Agrotec 49510 | Agrotec 49510 | Agrotec 49510 | Agrotec 49510 | Agrotec 49510 |
| | Coating agent | Coating agent E | Coating agent J | Coating agent K | Coating agent L | Coating agent M |
| | (a):(b):(c) | 94:5:1 | 95:5:0.01 | 95:5:0.1 | 91:5:4 | 88:5:7 |
| | Adhesive | Adhesive A | Adhesive A | Adhesive A | Adhesive A | Adhesive A |
| | Release film | Release film A | Release film A | Release film A | Release film A | Release film A |
| Characteristics evaluation | Brass brush scratch restoration properties | Good | Good | Good | Good | Good |
| | Water contact angle (°) | 108 | 107 | 107 | 108 | 107 |
| | Magic ink test | Good | Good | Good | Good | Good |
| | Elongation at break (%) | 80 | 80 | 80 | 80 | 60 |
| | Squeegee sliding test | Good | Poor | Good | Good | Good |

In a weight ratio ((a):(b):(c)) of components (a), (b) and (c), when a proportion of component (c) is 0.1 to 5 parts by weight, the performance is exhibited.

Test 4

Example 11: Preparation of Laminate 15

Laminate 15 having a coating thickness of 3 μm was obtained in a manner similar to the procedures of laminate 2 except that a coating rod No. 4 was used in place of the coating rod No. 8.

Example 12: Preparation of Laminate 16

Laminate 16 having a coating thickness of 10 μm was obtained in a manner similar to the procedures of laminate 2 except that a coating rod No. 16 was used in place of the coating rod No. 8.

Example 13: Preparation of Laminate 17

Laminate 17 having a coating thickness of 20 μm was obtained in a manner similar to the procedures of laminate 2 except that a coating rod No. 30 was used in place of the coating rod No. 8.

Example 14: Preparation of Laminate 18

Laminate 18 having a coating thickness of 30 μm was obtained in a manner similar to the procedures of laminate 2 except that a coating rod No. 55 was used in place of the coating rod No. 8.

Testing Method

A testing method is to be applied in a manner similar to the method in test 1.

TABLE 4

|  |  | Example 2 | Example 11 | Example 12 | Example 13 | Example 14 |
|---|---|---|---|---|---|---|
| Laminate Layer structure | | Laminate 2 | Laminate 15 | Laminate 16 | Laminate 17 | Laminate 18 |
| | Base material | Agrotec 49510 | Agrotec 49510 | Agrotec 49510 | Agrotec 49510 | Agrotec 49510 |
| | Coating agent | Coating agent E | Coating agent E | Coating agent E | Coating agent E | Coating agent E |
| | Surface layer thickness | 5 μm | 3 μm | 10 μm | 20 μm | 30 μm |
| | Adhesive | Adhesive A | Adhesive A | Adhesive A | Adhesive A | Adhesive A |
| | Release film | Release film A | Release film A | Release film A | Release film A | Release film A |
| Characteristics evaluation | Brass brush scratch restoration properties | Good | Poor | Good | Good | Good |
| | Water contact angle (°) | 108 | 108 | 108 | 108 | 108 |
| | Magic ink test | Good | Poor | Good | Good | Good |
| | Elongation at break (%) | 80 | 90 | 80 | 70 | 60 |
| | Squeegee sliding test | Good | Good | Good | Good | Good |

When the thickness of the surface layer is 5 μm or more, the performance is exhibited.

Test 5

Production Example 18: Preparation of Coating Agent N

In a 0.3 L scale-stainless steel bottle, 70.5 g of urethane (meth)acrylate-based resin (a), 3.8 g of fluorine-based compound (b), 1 g of fluorosilsesquioxane derivative (c), 20.4 g of methyl isobutyl ketone, 1.5 g of photopolymerization initiator (d) (trade name; IRGACURE 184; made by BASF SE) and 3 g of ultraviolet light absorber (f) (trade name; Tinuvin 384-2; made by BASF SE; solid content: 95 wt %) were, and the resulting mixture was stirred for 1 hour by a stirring blade to obtain coating agent N having a solid component (effective components (a), (b) and (c)) of 30% by weight. Coating agent N contains components (a), (b), (c) and (f).

Production Example 19: Preparation of Coating Agent O

In a 0.3 L scale-stainless steel bottle, 70.5 g of urethane (meth)acrylate-based resin (a), 3.8 g of fluorine-based compound (b), 1 g of fluorosilsesquioxane derivative (c), 20.4 g of methyl isobutyl ketone, 1.5 g of photopolymerization initiator (d) (trade name; IRGACURE 184; made by BASF SE) and 2.8 g of ultraviolet light absorber (f) (trade name; Tinuvin 292; made by BASF SE; solid content: 100 wt %) were put, and the resulting mixture was stirred for 1 hour by a stirring blade to obtain coating agent O having a solid component (effective components (a), (b) and (c)) of 30% by weight. Coating agent O contains components (a), (b), (c) and (f).

Production Example 20: Preparation of Coating Agent P

In a 0.3 L scale-stainless steel bottle, 70.5 g of urethane (meth)acrylate-based resin (a), 3.8 g of fluorine-based compound (b), 1 g of fluorosilsesquioxane derivative (c), 4.5 g of methyl isobutyl ketone, 1.5 g of photopolymerization initiator (d) (trade name; IRGACURE 184; made by BASF SE) and 18.8 g of inorganic filler (f) (trade name; Cobalt blue; made by CIK Nanotech Co., Ltd.; solid content: 15 wt %) were put, and the resulting mixture was stirred for 1 hour by a stirring blade to obtain coating agent P having a solid component (effective components (a), (b) and (c)) of 30% by weight. Coating agent P contains components (a), (b), (c) and (f).

Production Example 21: Preparation of Coating Agent Q

In a 0.3 L scale-stainless steel bottle, 70.5 g of urethane (meth)acrylate-based resin (a), 3.8 g of fluorine-based compound (b), 1 g of fluorosilsesquioxane derivative (c), 17.6 g of methyl isobutyl ketone, 1.5 g of photopolymerization initiator (d) (trade name; IRGACURE 184; made by BASF SE), 3 g of ultraviolet light absorber (f) (trade name; Tinuvin 384-2; made by BASF SE; solid component 95 wt. %) and 2.8 g of light stabilizer (f) (trade name; Tinuvin 292; made by BASF SE; solid content: 100 wt %) were put, and the resulting mixture was stirred for 1 hour by a stirring blade to obtain coating agent Q having a solid component (effective components (a), (b) and (c)) of 30% by weight. Coating agent Q contains components (a), (b), (c) and (f).

Production Example 22: Preparation of Coating Agent R

In a 0.3 L scale-stainless steel bottle, 70.5 g of urethane (meth)acrylate-based resin (a), 3.8 g of fluorine-based compound (b), 1 g of fluorosilsesquioxane derivative (c), 0.1 g of methyl isobutyl ketone, 1.5 g of photopolymerization initiator (d) (trade name; IRGACURE 184; made by BASF SE), 3 g of ultraviolet light absorber (f) (trade name; Tinuvin 384-2; made by BASF SE; solid content: 95 wt %), 2.8 g of light stabilizer (f) (trade name; Tinuvin 292; made by BASF SE; solid content: 100 wt %) and 18.8 g of inorganic filler (f) (trade name; Cobalt blue; made by CIK Nanotech Co., Ltd.; solid content: 15 wt %) were put, and the resulting mixture was stirred for 1 hour by a stirring blade to obtain coating agent R having a solid component (effective components (a), (b) and (c)) of 30% by weight. Coating agent R contains components (a), (b), (c) and (f).

Example 15: Preparation of Laminate 19

Laminate 19 was obtained in a manner similar to the procedures of laminate 2 except that coating agent N was used in place of coating agent E.

Example 16: Preparation of Laminate 20

Laminate 20 was obtained in a manner similar to the procedures of laminate 2 except that coating agent O was used in place of coating agent E.

Example 17: Preparation of Laminate 21

Laminate 21 was obtained in a manner similar to the procedures of laminate 2 except that coating agent P was used in place of coating agent E.

Example 18: Preparation of Laminate 22

Laminate 22 was obtained in a manner similar to the procedures of laminate 2 except that coating agent Q was used in place of coating agent E.

Example 19: Preparation of Laminate 23

Laminate 23 was obtained in a manner similar to the procedures of laminate 2 except that coating agent R was used in place of coating agent E.

Testing Method

A testing method is to be applied in a manner similar to the method in test 1.

TABLE 5

|  |  | Example 2 | Example 15 | Example 16 | Example 17 | Example 18 | Example 19 |
|---|---|---|---|---|---|---|---|
| Laminate Layer structure | Base material | Laminate 2 Agrotec 49510 | Laminate 19 Agrotec 49510 | Laminate 20 Agrotec 49510 | Laminate 21 Agrotec 49510 | Laminate 22 Agrotec 49510 | Laminate 23 Agrotec 49510 |
|  | Coating agent | Coating agent E | Coating agent N | Coating agent O | Coating agent P | Coating agent Q | Coating agent R |
|  | Proportion of (f) to solid content of (a) | 0% | Ultraviolet light absorber: 10% | Light stabilizer: 10% | Inorganic filler: 10% | Ultraviolet light absorber: 10% Light stabilizer: 10% | Ultraviolet light absorber: 10% Light stabilizer: 10% Inorganic filler: 10% |
|  | Adhesive | Adhesive A | Adhesive A | Adhesive A | Adhesive A | Adhesive A | Adhesive A |
|  | Release film | Release film A | Release film A | Release film A | Release film A | Release film A | Release film A |
| Characteristics evaluation | Brass brush scratch restoration properties | Good | Good | Good | Good | Good | Good |
|  | Water contact angle (°) | 108 | 108 | 108 | 108 | 107 | 107 |
|  | Magic ink test | Good | Good | Good | Good | Good | Good |
|  | Elongation at break (%) | 80 | 80 | 80 | 80 | 80 | 80 |
|  | Squeegee sliding test | Good | Good | Good | Good | Good | Good |

Also when component (f) is added thereto, the self-restoring properties, the water repellency (stain-proof properties), the stretchability and the slipperiness of the surface are not influenced.

Test 6

Example 20: Preparation of Laminate 24

Laminate 24 was obtained in a manner similar to the procedures of laminate 2 except that a thermoplastic polyurethane film (trade name; Esmer URS PX98; made by Nihon Matai Co., Ltd.; thickness: 150 µm) was used in place of the thermoplastic polyurethane film (trade name; Agrotec 49510; made by Argotec, LLC; thickness: 6 mil=152.4 µm).

Example 21: Preparation of Laminate 25

Laminate 25 was obtained in a manner similar to the procedures of laminate 2 except that a thermoplastic polyurethane film (trade name; XUS 2098; made by Sheedom Co., Ltd.; thickness: 150 µm) was used in place of the thermoplastic polyurethane film (trade name; Argotec 49510; made by Argotec, LLC; thickness: 6 mil=152.4 µm).

Example 22: Preparation of Laminate 26

Laminate 26 was obtained in a manner similar to the procedures of laminate 2 except that a thermoplastic polyurethane film (trade name; DUS 451; made by Sheedom Co., Ltd.; thickness: 150 µm) was used in place of the thermoplastic polyurethane film (trade name; Argotec 49510; made by Argotec, LLC; thickness: 6 mil=152.4 µm).

Comparative Example 5: Preparation of Laminate 27

Laminate 27 was obtained in a manner similar to the procedures of laminate 2 except that a polyester film (trade name; Lumirror T60; made by Toray Industries, Inc.; thickness: 125 µm) was used in place of the thermoplastic polyurethane film (trade name; Argotec 49510; made by Argotec, LLC; thickness: 6 mil=152.4 µm).

Testing Method

A testing method is to be applied in a manner similar to the method in test 1.

TABLE 6

|  |  | Example 2 | Example 20 | Example 21 | Example 22 | Comparative Example 5 |
|---|---|---|---|---|---|---|
| Laminate Layer structure | Base material | Laminate 2 Agrotec 49510 | Laminate 24 Esmer URS PX98 | Laminate 25 XUS 2098 | Laminate 26 DUS 450 | Laminate 27 Lumirror T60 |
|  | Coating agent | Coating agent E | Coating agent E | Coating agent E | Coating agent E | Coating agent E |
|  | Adhesive | Adhesive | Adhesive | Adhesive | Adhesive | Adhesive |
|  | Release film | Release film A | Release film A | Release film A | Release film A | Release film A |

TABLE 6-continued

|  |  | Example 2 | Example 20 | Example 21 | Example 22 | Comparative Example 5 |
|---|---|---|---|---|---|---|
| Characteristics evaluation | Brass brush scratch restoration properties | Good | Good | Good | Good | Good |
|  | Water contact angle (°) | 108 | 108 | 108 | 108 | 108 |
|  | Magic ink test | Good | Good | Good | Good | Good |
|  | Elongation at break (%) | 80 | 80 | 80 | 80 | 5 |
|  | Squeeze sliding test | Good | Good | Good | Good | Good |

If the thermoplastic polyurethane film is used in the base material, the laminate having the excellent stretchability is obtained, irrespective of a kind thereof.

Test 7

Production Example 23: Creation of Adherend A

Adherend A was prepared by scratching, by using sandpaper (#800), one surface of a polycarbonate sheet (trade name; PC1151; made by Teijin Limited; Panlite thickness: 2 mm; width: 70 mm; length: 150 mm).

Example 23: Preparation of Test Body A

A release film of laminate 2 cut into a size of a width of 40 mm and a length of 130 mm was peeled off, and an aqueous solution prepared by mixing 2 to 3 drops of baby shampoo (baby whole body shampoo; made by Johnson & Johnson Consumer Inc.) to 1 L of water was sprayed, by a sprayer, onto a surface on an adhesive layer side, and onto a polycarbonate sheet (trade name; PC1151; made by Teijin Limited; Panlite thickness: 2 mm; width: 70 mm; length: 150 mm), and the adhesive layer surface of the laminate was pasted onto the polycarbonate sheet while air bubbles and water bubbles were pushed out by a rubber squeegee to prepare test body A.

Example 24: Preparation of Test Body B

Test body B was prepared in a manner similar to the procedures in Example 23 except that adherend A was used in place of the polycarbonate sheet (trade name; PC1151; made by Teijin Limited; Panlite thickness: 2 mm; width: 70 mm; length: 150 mm).

Testing Method (1) Optical Characteristics: Total Luminous Transmittance and Haze Total luminous transmittance and haze were measured, by using a haze meter (Suga Test Instrument Hz-2), by setting a test specimen on a side of an aperture of an integrating sphere in a sample measurement chamber by a sample holder (JIS K7105).

(2) Durability: Chipping Test

Appearance of a base material was visually confirmed, by using a simplified chipping tester (JNC in-house), by allowing 50 g of crushed stones (No. 7) to collide with the base material at 40 km/h. When a laminate was pasted onto the base material, a film was peeled off from the base material and the appearance was confirmed.

Good: No scratch.
Poor: Scratched.

TABLE 7

|  |  | Reference Example 1 | Reference Example 2 | Example 23 | Example 24 |
|---|---|---|---|---|---|
| Test body Layer structure | Base material | PC1151 | Adherend A | Test body A PC1151 | Test body B Adherend A |
|  | Laminate | — | — | Laminate 2 | Laminate 2 |
| Characteristics evaluation | Total luminous transmittance (% T) | 91.0 | 89.0 | 91.0 | 91.0 |
|  | Haze (%) | 0.8 | 12.7 | 0.8 | 1.3 |
|  | Durability | Poor | Poor | Good | Good |

The surface can be smoothened by pasting the laminate thereon, and therefore a haze value is reduced and designability of the adherend is improved. Moreover, the base material can be protected by pasting the laminate thereon, and the durability is improved.

Publications cited herein, all of the references, including patent applications and patents, individually and specifically indicated to each document, and incorporate by reference, and forth in its entirety herein in the same extent, incorporated by reference herein.

Use of the noun and the similar directive used in connection with the description (particularly with reference to the following claims) in the present invention, or particularly pointed out herein, unless otherwise indicated herein or otherwise clearly contradicted by context, is to be construed to cover both the singular form and the plural form. The terms "comprising," "having," "including" and "containing," unless otherwise noted, be construed as open-ended terms (namely, meaning "including, but not limited to").

Recitations of numerical ranges herein, unless otherwise indicated herein, is intended merely to serve as shorthand for referring individually each value falling within its scope and which, each value, as if it were individually recited herein, are incorporated herein. All of the methods described herein, or particularly pointed out herein, unless otherwise indicated herein or otherwise clearly contradicted by context, can be performed in any suitable order. The use of any and all examples, or exemplary language ("such as") provided herein, is intended merely to better illuminate the invention and does not pose a limitation on the scope of the invention unless otherwise claimed. No language herein should be construed as indicating any non-claimed element as essential to the practice of the invention.

Preferred embodiments of the invention are described herein, including the best modes known to the present inventors for carrying out the invention. Variations of the preferred embodiments may become apparent to those having ordinary skill in the art upon reading the foregoing description. The present inventors expect skilled artisans to employ such variations as appropriate, and the present inventors intend for the invention to be practiced otherwise than as specifically described herein. Accordingly, the invention includes all modifications and equivalents of the subject matters recited in the claims appended hereto as permitted by applicable laws. Further, particularly pointed out herein, unless otherwise indicated or otherwise clearly contradicted by context, any combination of the above-described elements in all possible variations thereof is encompassed by the invention.

What is claimed is:

1. A laminate, comprising:
   a base material film formed of a thermoplastic polyurethane; and
   a surface layer formed by curing a coating agent on a first surface side of the base material film, wherein the coating agent comprises a urethane (meth)acrylate-based resin (a), a fluorine-based compound (b), a fluorosilsesquioxane derivative (c) and a photopolymerization initiator (d),
   the urethane (meth)acrylate-based resin (a) has weight average molecular weight of 10,000 to 800,000, and
   the fluorine-based compound (b) has at least two polymerizable functional groups;
   the fluorosilsesquioxane derivative (c) has at least one polymerizable functional group; and
   the coating agent contains 1 to 9% by weight of the fluorine-based compound (b) based on a total amount of the urethane (meth)acrylate-based resin (a) and the fluorine-based compound (b).

2. The laminate according to claim 1, wherein the fluorine-based compound (b) is perfluoropolyether having a (meth)acryloyl group.

3. The laminate according to claim 1, wherein the fluorosilsesquioxane derivative (c) is cage structure fluorosilsesquioxane.

4. The laminate according to claim 1, wherein the coating agent contains 0.1 to 10% by weight of the fluorosilsesquioxane derivative (c) based on a total amount of the urethane (meth)acrylate-based resin (a), the fluorine-based compound (b) and the fluorosilsesquioxane derivative (c).

5. The laminate according to claim 1, comprising:
   an adhesive layer on a side opposite to the first surface side of the base material film; and
   a release film on a surface opposite to the base material film of the adhesive layer,
   wherein the adhesive layer is composed of at least one resin selected from an acrylic resin, a urethane-based resin, a rubber-based resin and a silicone-based resin, and at least one release agent selected from a fluorine-based resin, a silicone resin and long-chain-containing carbamate is applied onto a surface of the release film relative to the adhesive layer.

6. A surface-protected article, comprising:
   the laminate according to claim 5, from which the release film is peeled off; and
   an article prepared by attaching, on a surface of the article, the laminate from which the release film is peeled off, by the adhesive layer.

* * * * *